(12) United States Patent
Mizunuma et al.

(10) Patent No.: US 11,388,612 B2
(45) Date of Patent: Jul. 12, 2022

(54) COMMUNICATION TERMINAL DEVICE AND COMMUNICATION SYSTEM

(71) Applicant: Murata Manufacturing Co., Ltd., Kyoto (JP)

(72) Inventors: Ryuken Mizunuma, Kyoto (JP); Satoshi Tanaka, Kyoto (JP); Yasuhisa Yamamoto, Kyoto (JP); Akiko Itabashi, Kyoto (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

(21) Appl. No.: 17/142,430

(22) Filed: Jan. 6, 2021

(65) Prior Publication Data
US 2021/0219147 A1    Jul. 15, 2021

(30) Foreign Application Priority Data

Jan. 10, 2020  (JP) .............................. JP2020-003159
Jul. 16, 2020  (JP) .............................. JP2020-122390

(51) Int. Cl.
*H04W 16/26*   (2009.01)
*H04B 17/318*  (2015.01)
*H01Q 1/27*    (2006.01)
*H04W 88/04*   (2009.01)

(52) U.S. Cl.
CPC ............ *H04W 16/26* (2013.01); *H01Q 1/273* (2013.01); *H04B 17/318* (2015.01); *H04W 88/04* (2013.01)

(58) Field of Classification Search
CPC combination set(s) only.
See application file for complete search history.

(56) References Cited

U.S. PATENT DOCUMENTS

| | | | |
|---|---|---|---|
| 2012/0086774 A1* | 4/2012 | Nam | G02B 30/25 348/43 |
| 2016/0011910 A1* | 1/2016 | Kang | G06F 9/5044 718/104 |
| 2016/0034042 A1* | 2/2016 | Joo | G06F 3/017 345/633 |
| 2016/0204839 A1 | 7/2016 | Liu et al. | |
| 2018/0323508 A1 | 11/2018 | Chigusa et al. | |

(Continued)

FOREIGN PATENT DOCUMENTS

| | | |
|---|---|---|
| JP | 2018507604 A | 3/2018 |
| JP | 2019022218 A | 2/2019 |
| WO | 2017086290 A1 | 5/2017 |

*Primary Examiner* — Junpeng Chen
(74) *Attorney, Agent, or Firm* — Pearne & Gordon LLP

(57) ABSTRACT

A communication terminal device is a glasses-type communication terminal device having an optically transmissive display mounted thereon. The communication terminal device includes first and second radio-frequency modules that perform radio-frequency signal processing and a baseband module that is connected to the first and second radio-frequency modules via communication lines so as to be communicable and that performs baseband signal processing. The first and second radio-frequency modules are selectively switched by the baseband module to perform a reception operation. When the first radio-frequency module performs the reception operation, a reception signal received by the first radio-frequency module is retransmitted from the second radio-frequency module.

14 Claims, 21 Drawing Sheets

(56) References Cited

U.S. PATENT DOCUMENTS

| | | |
|---|---|---|
| 2019/0027833 A1 | 1/2019 | Ayala Vazquez et al. |
| 2019/0159018 A1* | 5/2019 | Basu Mallick ....... H04W 8/005 |
| 2019/0166640 A1* | 5/2019 | Wei ................... H04W 72/1252 |
| 2019/0229395 A1* | 7/2019 | Hintermann ............. H01Q 1/22 |
| 2019/0239114 A1* | 8/2019 | Martin ...................... H04L 1/00 |
| 2019/0368656 A1* | 12/2019 | Xu ......................... F16M 13/04 |
| 2020/0212547 A1* | 7/2020 | Huh ....................... H01Q 21/29 |
| 2021/0013953 A1* | 1/2021 | Hormis ................ H04B 7/0697 |
| 2021/0051737 A1* | 2/2021 | Sarkis ............... H04W 72/1247 |
| 2021/0068050 A1* | 3/2021 | Sampath ............... H04W 48/12 |

* cited by examiner

COMMUNICATION TERMINAL DEVICE AND COMMUNICATION SYSTEM

CROSS REFERENCE TO RELATED APPLICATIONS

This application claims priority from Japanese Patent Application No. 2020-003159 filed on Jan. 10, 2020, and claims priority to Japanese Patent Application No. 2020-122390 filed on Jul. 16, 2020. The contents of these applications are incorporated herein by reference in their entireties.

BACKGROUND OF THE DISCLOSURE

Field of the Disclosure

The present disclosure relates to a communication terminal device and a communication system.

Description of the Related Art

Use of an augmented reality (AR) function is enhanced. In the AR function, actual image information and virtual information that concerns the image information and that is superimposed on the image information are displayed to augment actual perceptual experience. For example, glasses-type communication terminal devices are disclosed (for example, refer to Japanese Unexamined Patent Application Publication (Translation of PCT Application) No. 2018-507604) as communication terminal devices for realizing such an AR function (hereinafter also referred to as "AR terminals").

In order to realize the AR function, it is necessary to frequently transmit and receive a huge amount of information, such as moving image information, between terminals. Accordingly, use of millimeter-wave communication, such as Wireless Gigabit (WiGig) (registered trademark), which is capable of high-speed and high-capacity communication with low delay is required.

Broadcast delivery services of content have been considered in recent years, in which information about a musician or a player is broadcasted from a radio base station to multiple AR terminals held by audience within a certain area, such as a concert hall or a playing field, for example, a stadium. Since it is necessary to deliver a large amount of data in real time with low delay and at high speed in a state in which the many AR terminals are concurrently connected, the millimeter-wave communication, such as the 5-th generation mobile communication system (hereinafter also simply referred to as "5G") and the WiGig (registered trademark), which are new communication standards for mobile terminals, are appropriately used. In contrast, since the millimeter-wave communication has large propagation loss and narrow directivity, a received signal strength indicator may be reduced due to an obstacle, such as a structure or a human body, to inhibit an excellent communication state from being kept.

BRIEF SUMMARY OF THE DISCLOSURE

Accordingly, it is an object of the present disclosure to provide a communication terminal device and a communication system, which are capable of improving the robustness of communication (improving the trouble resistance, that is, stabilizing the communication quality) when the many communication terminal devices are concurrently connected.

According to an embodiment of the present disclosure, a communication terminal device is a glasses-type communication terminal device having an optically transmissive display mounted thereon. The communication terminal device includes first and second radio-frequency modules that perform radio-frequency signal processing and a baseband module that is connected to the first and second radio-frequency modules via communication lines so as to be communicable and that performs baseband signal processing. The first and second radio-frequency modules are selectively switched by the baseband module to perform a reception operation. When the first radio-frequency module performs the reception operation, a reception signal received by the first radio-frequency module is retransmitted from the second radio-frequency module.

With the above configuration, the first radio-frequency module, among the two radio-frequency modules, performs the reception operation, and the second radio-frequency module retransmits the reception signal. Accordingly, for example, when the multiple communication terminal devices are arranged in the coverage area of a radio base station and the many communication terminal devices are concurrently connected, building relay connection through cooperation between the multiple communication terminal devices enables the communication quality in the coverage area to be improved, thus improving the robustness of communication (improving the trouble resistance, that is, stabilizing the communication quality).

According to an embodiment of the present disclosure, a communication system includes the multiple communication terminal devices that are arranged in a coverage area of a radio base station. If a received signal strength indicator is lower than a predetermined first threshold value, the communication terminal device transmits a communication quality request signal requesting the received signal strength indicator of an external communication terminal device to the external communication terminal device. The communication terminal device transmits the received signal strength indicator to an external communication terminal device in response to the communication quality request signal from the external communication terminal device. If the received signal strength indicator transmitted from an external communication terminal device is higher than or equal to a predetermined second threshold value, the communication terminal device transmits a repeater operation requesting signal requesting a repeater operation to the external communication terminal device. The communication terminal device retransmits the reception signal in response to the repeater operation requesting signal.

With the above configuration, when the multiple communication terminal devices are arranged in the coverage area of a radio base station and the many communication terminal devices are concurrently connected, the cooperation between the multiple communication terminal devices builds the relay connection between the multiple communication terminal devices. Accordingly, it is possible to improve the communication quality in the coverage area and to improve the robustness of communication (improve the trouble resistance, that is, stabilize the communication quality).

According to the present disclosure, it is possible to provide a communication terminal device and a communication system, which are capable of improving the robustness of communication (improving the trouble resistance, that is, stabilizing the communication quality) when the many communication terminal devices are concurrently connected.

Other features, elements, characteristics and advantages of the present disclosure will become more apparent from the following detailed description of preferred embodiments of the present disclosure with reference to the attached drawings.

DETAILED DESCRIPTION OF THE DISCLOSURE

Communication terminal devices and communication systems according to the embodiments will herein be described in detail with reference to the drawings. The present disclosure is not limited by the embodiments. The respective embodiments are only examples, and partial replacement or combination of components indicted in different embodiments is available.

First Embodiment

Figure 1:
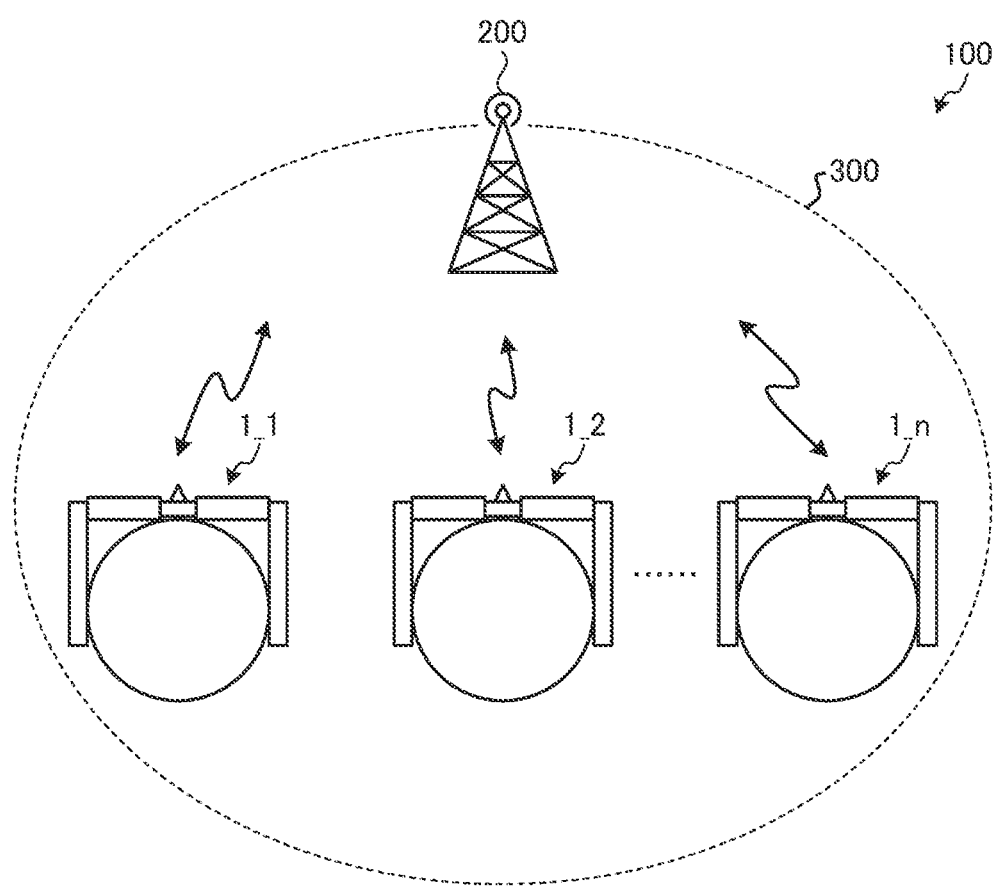
FIG. 1 is a schematic diagram schematically illustrating the configuration of a communication system according to a first embodiment.

FIG. 1 is a schematic diagram schematically illustrating the configuration of a communication system according to a first embodiment. Referring to FIG. 1, a communication system 100 according to the first embodiment is composed of multiple communication terminal devices 1_1, 1_2, . . . , and 1_n (n is a natural number) arranged in a coverage area 300 of a radio base station 200.

In the present disclosure, the communication terminal devices 1_1, 1_2, . . . , and 1_n are XR terminals realizing an extended reality (XR) function and are, for example, glasses-type wearable communication terminal devices each having an optically transmissive display mounted thereon. When the communication terminal devices 1_1, 1_2, . . . , and 1_n are not necessary to be particularly discriminated, each of the communication terminal devices 1_1, 1_2, . . . , and 1_n is also simply referred to as a "communication terminal device 1". Examples of the XR includes an augmented reality (AR), a mixed reality (MR), and a virtual reality (VR).

A variety of information is broadcasted from the radio base station 200 to the respective communication terminal devices 1_1, 1_2, . . . , and 1_n. Although the millimeter-wave band communication, such as the 5-th generation mobile communication system (5G) or the WiGig (registered trademark), is supposed as communication between the radio base station 200 and each of the communication terminal devices 1_1, 1_2, . . . , and 1_n, the communication between the radio base station 200 and each of the communication terminal devices 1_1, 1_2, . . . , and 1_n is not limited to the millimeter-wave band communication and may be, for example, 5-GHz band communication, such as Sub6 or WiFi (The Institute of Electrical and Electronics Engineers, Inc. (IEEE) 802.11) (registered trademark), or communication using a 4-th generation mobile communication system (4G). Alternatively, the communication between the radio base station 200 and each of the communication terminal devices 1_1, 1_2, . . . , and 1_*n* may be ultra wide band (UWB) wireless communication.

In the present disclosure, each of the communication terminal devices 1_1, 1_2, . . . , and 1_*n* requests a communication quality index. Although a received signal strength indicator (RSSI), a user throughput, the number of connected terminals, a packet retransmission rate, and a modulation rate are exemplified as the communication quality index, an example is described in the present disclosure in which the RSSI is used as the communication quality index.

In the present disclosure, each of the communication terminal devices 1_1, 1_2, . . . , and 1_*n* relays a reception signal in response to the request.

Figure 2A:
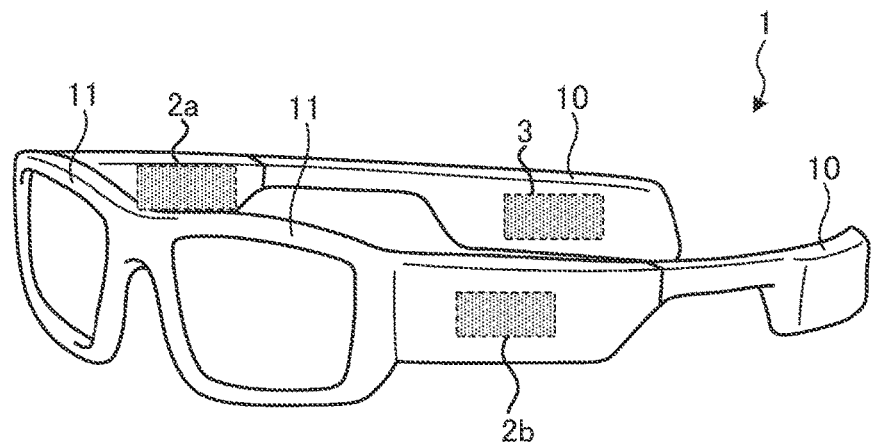
FIG. 2A is a diagram schematically illustrating a first example of a communication terminal device according to the first embodiment.
Figure 2B:
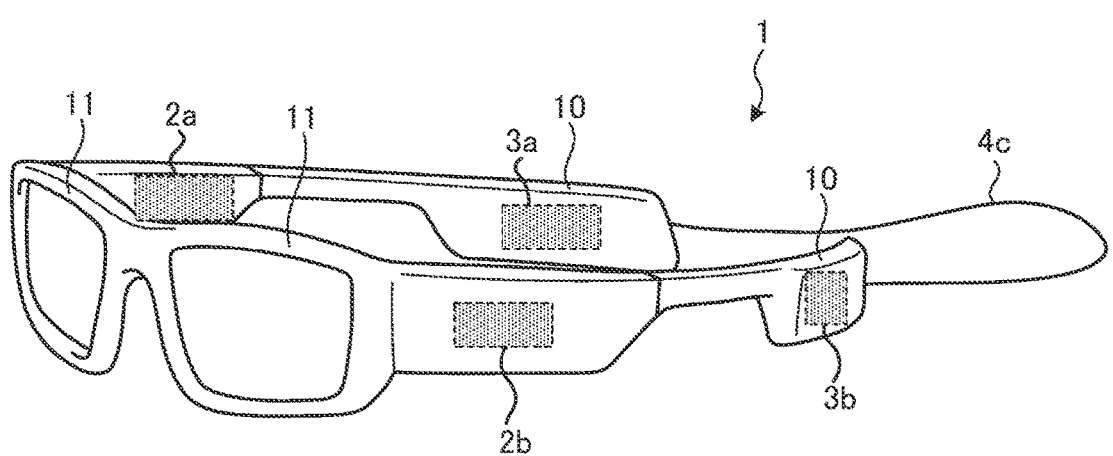
FIG. 2B is a diagram schematically illustrating a second example of the communication terminal device according to the first embodiment.
Figure 4A:
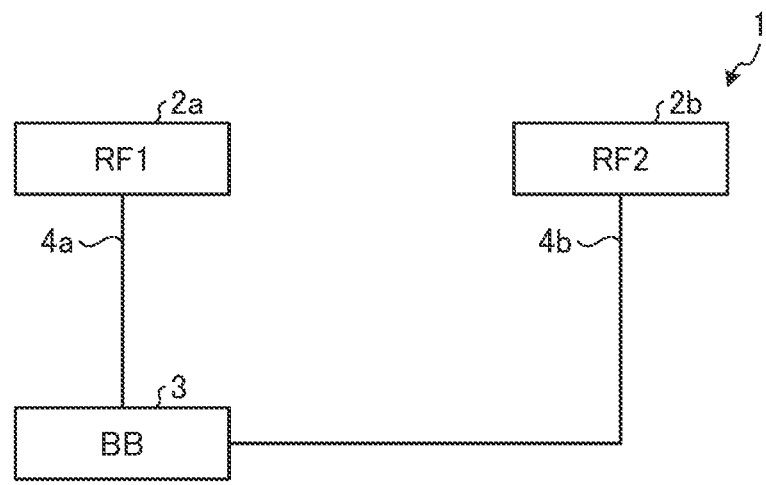
FIG. 4A is a diagram illustrating a first example of the block configuration of the communication terminal device illustrated in FIG. 2A.
Figure 4B:
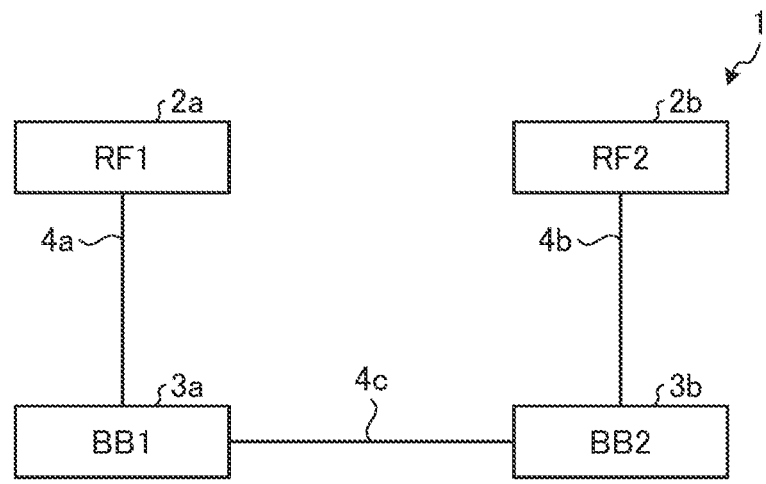
FIG. 4B is a diagram illustrating a first example of the block configuration of the communication terminal device illustrated in FIG. 2B.
Figure 4C:
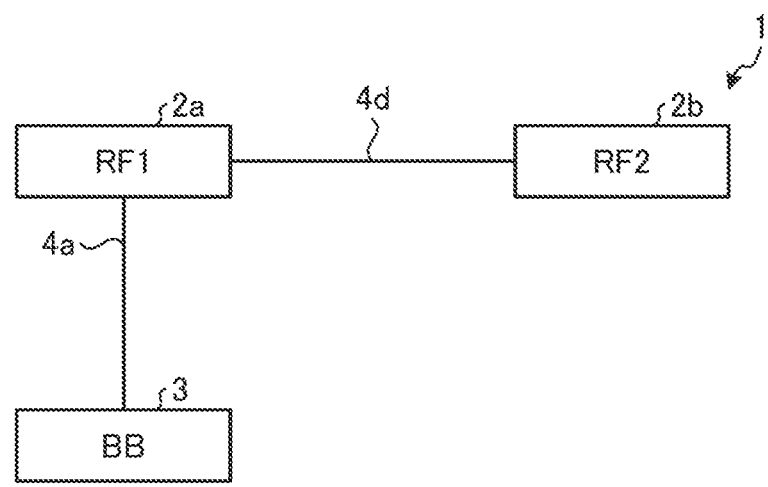
FIG. 4C is a diagram illustrating a second example of the block configuration of the communication terminal device illustrated in FIG. 2A.
Figure 4D:
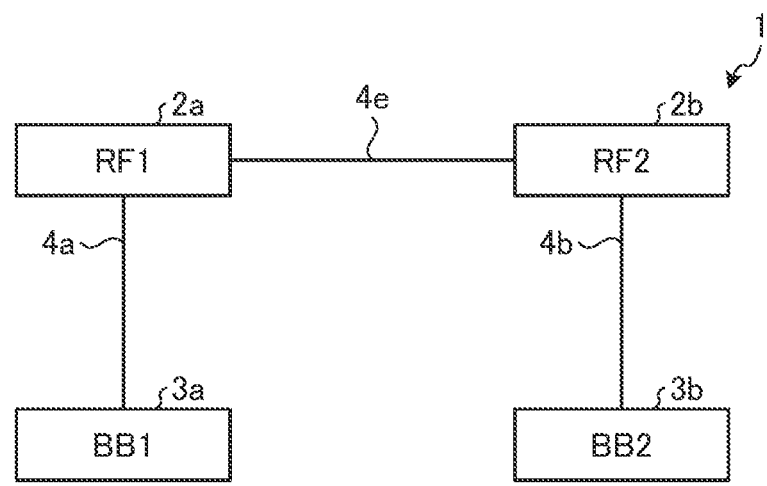
FIG. 4D is a diagram illustrating a second example of the block configuration of the communication terminal device illustrated in FIG. 2B.

FIG. 2A is a diagram schematically illustrating a first example of the communication terminal device according to the first embodiment. FIG. 2B is a diagram schematically illustrating a second example of the communication terminal device according to the first embodiment. FIG. 4A is a diagram illustrating a first example of the block configuration of the communication terminal device illustrated in FIG. 2A. FIG. 4B is a diagram illustrating a first example of the block configuration of the communication terminal device illustrated in FIG. 2B. FIG. 4C is a diagram illustrating a second example of the block configuration of the communication terminal device illustrated in FIG. 2A. FIG. 4D is a diagram illustrating a second example of the block configuration of the communication terminal device illustrated in FIG. 2B.

First, the first examples illustrated in FIG. 2A and FIG. 4A will be described. As illustrated in FIG. 2A and FIG. 4A, the communication terminal device 1 includes a first radio-frequency (RF) module (RF1) 2*a* and a second RF module (RF2) 2*b*, which perform radio-frequency signal processing of transmission and reception signals, and a baseband module (BB) 3 performing baseband signal processing. In the example illustrated in FIG. 2A, the first RF module (RF1) 2*a* and the second RF module (RF2) 2*b* are provided on right-side and left-side temples 10, respectively, and the baseband module (BB) 3 is provided on one temple 10.

The first RF module (RF1) 2*a* is connected to the baseband module (BB) 3 via a communication line 4*a*. The second RF module (RF2) 2*b* is connected to the baseband module (BB) 3 via a communication line 4*b*. The communication lines 4*a* and 4*b* are intermediated frequency (IF) cables for transmitting and receiving IF signals and various commands between the first RF module (RF1) 2*a* and the baseband module (BB) 3 and between the second RF module (RF2) 2*b* and the baseband module (BB) 3, respectively. The communication lines 4*a* and 4*b* may be metal cables or may be optical fiber cables. The communication lines 4*a* and 4*b* may be configured so as to be disposed in the temples 10 or a frame 11 or may be wired along the temples 10 or the frame 11. The present disclosure is not limited by the disposition structure of the communication lines 4*a* and 4*b*. In addition, as illustrated in FIG. 4C, the first RF module (RF1) 2*a* and the second RF module (RF2) 2*b* may be configured so as to be connected to each other via a communication line 4*d*. In this case, the second RF module (RF2) 2*b* is connected to the baseband module (BB) 3 via the communication line 4*a*, the first RF module (RF1) 2*a*, and the communication line 4*d*. An aspect may be supposed in which multiple communication lines 4*d* are provided.

Next, the second examples illustrated in FIG. 2*b* and FIG. 4*b* will be described. As illustrated in FIG. 2*b* and FIG. 4*b*, the communication terminal device 1 includes the first RF module (RF1) 2*a* and the second RF module (RF2) 2*b*, which perform the radio-frequency signal processing of transmission and reception signals, and a first baseband module (BB1) 3*a* and a second baseband module (BB2) 3*b*, which perform the baseband signal processing. In the example illustrated in FIG. 2*b*, the first RF module (RF1) 2*a* and the first baseband module (BB1) 3*a* are provided on one temple 10, and the second RF module (RF2) 2*b* and the second baseband module (BB2) 3*b* are provided on the other temple 10.

The first RF module (RF1) 2*a* is connected to the first baseband module (BB) 3*a* via the communication line 4*a*. The second RF module (RF2) 2*b* is connected to the second baseband module (BB) 3*b* via the communication line 4*b*. The communication line 4*a* is an IF cable for transmitting and receiving IF signals and various commands between the first RF module (RF1) 2*a* and the first baseband module (BB) 3*a*. The communication line 4*b* is an IF cable for transmitting and receiving IF signals and various commands between the second RF module (RF2) 2*b* and the second baseband module (BB) 3*b*. A communication line 4*c* is an IF cable for transmitting and receiving various commands between the first baseband module (BB) 3*a* and the second baseband module (BB) 3*b*. The communication lines 4*a*, 4*b*, and 4*c* may be metal cables or may be optical fiber cables. The communication lines 4*a* and 4*b* may be configured so as to be disposed in the temples 10 or the frame 11 or may be wired along the temples 10 or the frame 11. The communication line 4*c* may be a cable provided between the respective temples 10, as illustrated in FIG. 2*b*. The communication line 4*c* may be configured so as to be disposed in the temple 10 or the frame 11 or may be wired along the temple 10 or the frame 11, as in the communication lines 4*a* and 4*b*. The present disclosure is not limited by the disposition structure of the communication lines 4*a*, 4*b*, and 4*c*. In addition, as illustrated in FIG. 4D, the first RF module (RF1) 2*a* and the second RF module (RF2) 2*b* may be configured so as to be connected to each other via a communication line 4*e*. In this case, the transmission and reception of the various commands between the first baseband module (BB) 3*a* and the second baseband module (BB) 3*b* is performed via the communication line 4*a*, the first RF module (RF1) 2*a*, the communication line 4*e*, the second RF module (RF2) 2*b*, and the communication line 4*b*. An aspect may be supposed in which multiple communication lines 4*e* are provided.

In the present disclosure, the first RF module (RF1) 2*a* and the second RF module (RF2) 2*b* each have a configuration in which an antenna is integrated with a radio frequency integrated circuit (RFIC). Specifically, for example, the first RF module (RF1) 2*a* and the second RF module (RF2) 2*b* may each have a configuration in which an array antenna having multiple patch antennas arrayed therein is provided on the front face of a flexible substrate having flexibility, and the RFIC is provided on the rear face of the flexible substrate, that is, on the face opposite to the face on which the patch antennas are provided. In this case, flexing the flexible substrate enables radiation planes of the antennas to be provided in multiple directions. In the first examples and the second examples of the first embodiment, a transmission signal from any direction is capable of being received and the transmission signal is capable of being relayed from side to side. Accordingly, the first RF module (RF1) 2a and the second RF module (RF2) 2b are provided on the right-side and left-side temples. This is the best mode of the present disclosure.

Figure 3A:
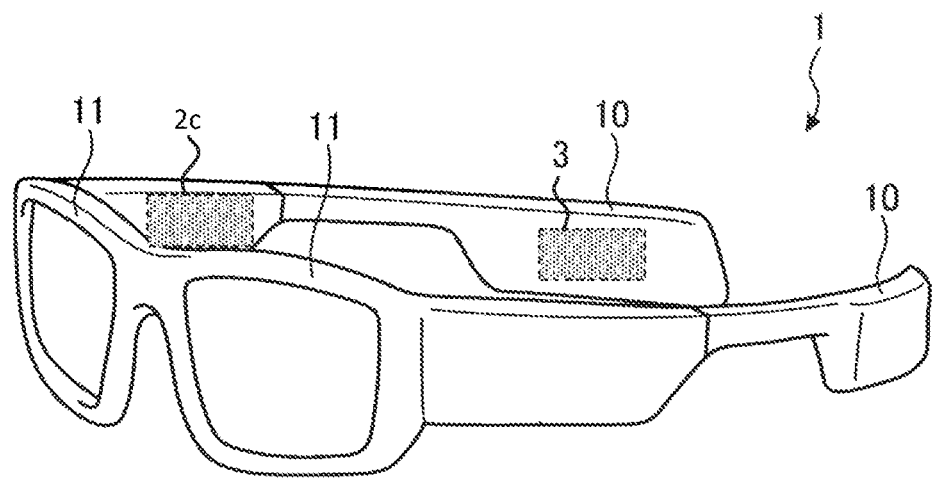
FIG. 3A is a diagram schematically illustrating a modification of the communication terminal device according to the first embodiment.
Figure 3B:
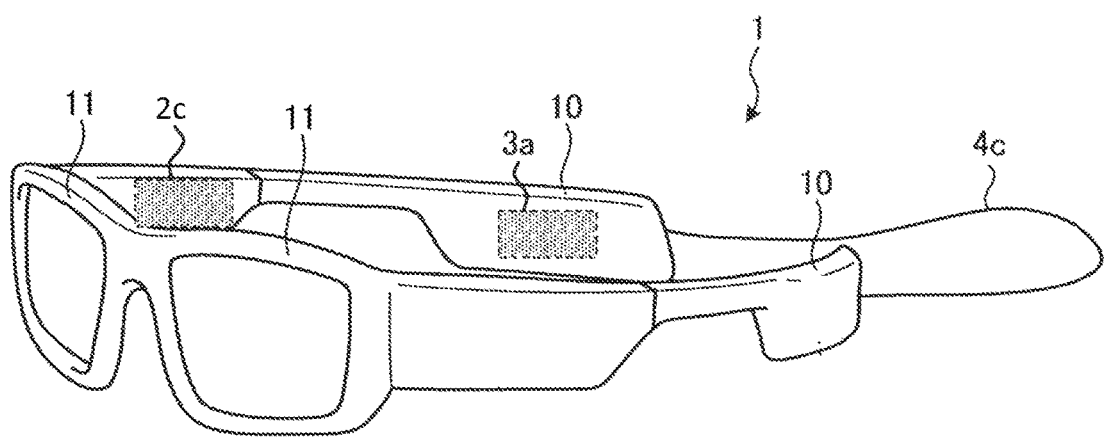
FIG. 3B is a diagram schematically illustrating a modification of the communication terminal device according to the first embodiment.

The configurations in which the first RF module (RF1) 2a and the second RF module (RF2) 2b are mounted on the right-side and left-side temples are illustrated in FIG. 2a and FIG. 2b. In FIG. 3A and FIG. 3B, a third RF module 2c is provided on either of the right-side and left-side temples. Although the third RF module 2c is mounted on the right-side temple when a user wears the communication terminal device 1 in FIG. 3A and FIG. 3B, the third RF module 2c may be mounted on the left-side temple. The third RF module 2c is formed by integrating the first RF module (RF1) 2a with the second RF module (RF2) 2b. A transmission-and-reception function is integrated with a repeater function in the third RF module 2c. With this configuration, since it is sufficient for a power supply line to be provided on one side and it is sufficient for exchange of signals to be performed on one side, it is not necessary to pass the communication lines through the frame 11.

When a state is supposed in the above configuration, in which the many communication terminal devices 1_1, 1_2, . . . , and 1_n are concurrently connected, for example, in which a variety of information is broadcasted from the radio base station 200 to the multiple communication terminal devices 1_1, 1_2, . . . , and 1_n within a certain area, such as a concert hall or a playing field, for example, a stadium, the radio base station 200 or a relay base station (not illustrated) may be arranged above the user. In such a usage environment, one of the radiation planes of the antennas provided in at least the first RF module (RF1) 2a and the second RF module (RF2) 2b is desirably arranged so as to be directed upward in a state in which the user wears the communication terminal device 1. As described above, the radiation planes of the antennas are optimized in accordance with the supposed usage environment of the communication terminal device 1.

The aspect of the first RF module (RF1) 2a and the second RF module (RF2) 2b is not limited to this and, for example, an aspect may be supposed in which multiple patch antennas are arrayed on the front face of a dielectric substrate. In this case, the dielectric substrate on which the array antenna is provided is exemplified by, for example, a low temperature co-fired ceramic (LTCC) multilayer substrate, a resin multilayer substrate formed by laminating multiple resin layers made of resin, such as epoxy or polyimide, a resin multilayer substrate formed by laminating multiple resin layers made of liquid crystal polymer (LCP) having lower permittivity, a resin multilayer substrate formed by laminating multiple resin layers made of fluorocarbon resin, and a ceramic multilayer substrate (excluding the low temperature fired ceramic multilayer substrate). The present disclosure is not limited by the specific configuration of the first RF module (RF1) 2a and the second RF module (RF2) 2b.

In the first examples illustrated in FIG. 2a and FIG. 4a, the baseband module (BB) 3 includes a processor that performs transmission and reception control of the first RF module (RF1) 2a and the second RF module (RF2) 2b, in addition to a baseband integrated circuit (BBIC) that performs the baseband signal processing. Specifically, for example, the baseband module (BB) 3 may have a configuration in which the BBIC and the processor are provided on the flexible substrate. The configuration of the baseband module (BB) 3 is not limited to the above one, and an aspect may be supposed in which the processor performs the baseband signal processing. The present disclosure is not limited by the specific configuration of the baseband module (BB) 3.

In the second examples illustrated in FIG. 2b and FIG. 4b, the first baseband module (BB) 3a includes a processor that performs the transmission and reception control of the first RF module (RF1) 2a, in addition to a BBIC that performs the baseband signal processing. In the second examples illustrated in FIG. 2b and FIG. 4b, the second baseband module (BB) 3b includes a processor that performs the transmission and reception control of the second RF module (RF2) 2b, in addition to a BBIC that performs the baseband signal processing. Specifically, for example, the first baseband module (BB) 3a and the second baseband module (BB) 3b may each have a configuration in which the BBIC and the processor are provided on the flexible substrate. The configurations of the first baseband module (BB) 3a and the second baseband module (BB) 3b are not limited to the above ones, and an aspect may be supposed in which the processor performs the baseband signal processing. The present disclosure is not limited by the specific configurations of the first baseband module (BB) 3a and the second baseband module (BB) 3b.

The communication terminal device 1 in the present disclosure performs a diversity operation to selectively switch between the first RF module (RF1) 2a and the second RF module (RF2) 2b in a reception operation. In other words, the communication terminal device 1 selects one of the first RF module (RF1) 2a and the second RF module (RF2) 2b, which has a better radio-wave state, to perform the reception operation.

Figure 5:
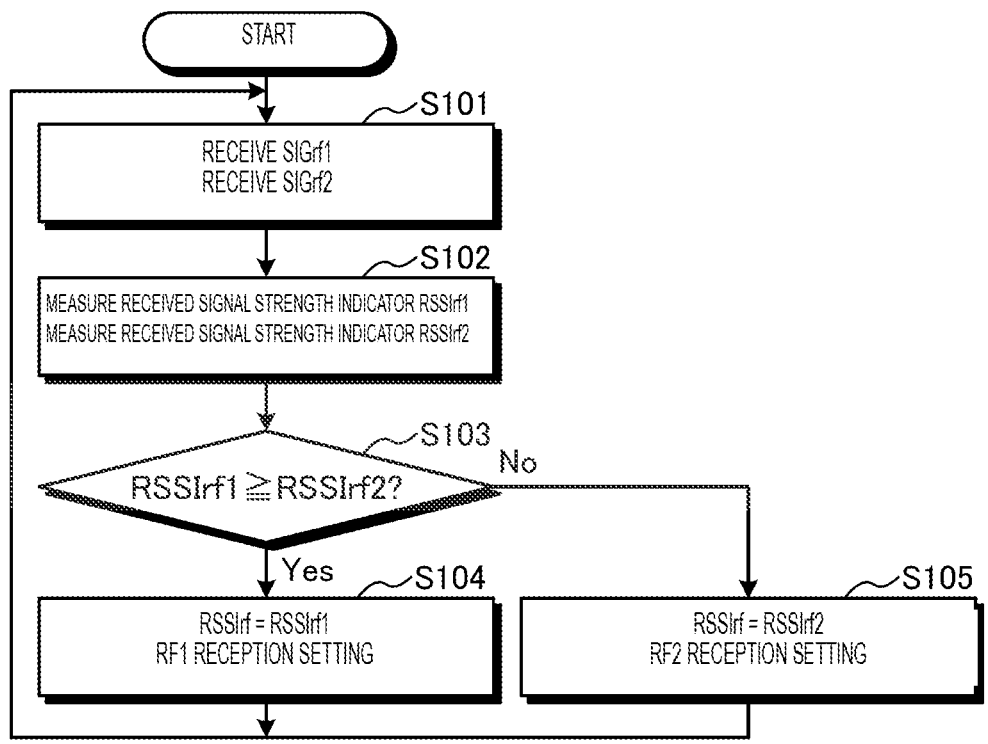
FIG. 5 is a schematic flowchart illustrating a diversity operation in the communication terminal device according to the first embodiment.

The diversity operation in the communication terminal device 1 according to the first embodiment will now be simply described with reference to FIG. 5. FIG. 5 is a schematic flowchart illustrating the diversity operation in the communication terminal device according to the first embodiment. The first examples illustrated in FIG. 2a and FIG. 4a are described in the following description. Although the control subject in each flowchart described below is the processor provided in the baseband module (BB) 3 in the communication terminal device 1, the communication terminal device 1 is described as the subject here.

Referring to FIG. 5, in Step S101, the communication terminal device 1 receives certain radio waves in the first RF module (RF1) 2a and the second RF module (RF2) 2b. Here, radio waves received by the first RF module (RF1) 2a are referred to as an RF1 signal SIGrf1, and radio waves received by the second RF module (RF2) 2b are referred to as an RF2 signal SIGrf2.

In Step S102, the communication terminal device 1 measures a received signal strength indicator RSSIrf1 of the RF1 signal SIGrf1 and a received signal strength indicator RSSIrf2 of the RF2 signal SIGrf2 to compare the received signal strength indicator RSSIrf1 of the RF1 signal SIGrf1 with the received signal strength indicator RSSIrf2 of the RF2 signal SIGrf2. Specifically, in Step S103, the communication terminal device 1 determines whether the received signal strength indicator RSSIrf1 of the RF1 signal SIGrf1 is higher than or equal to the received signal strength indicator RSSIrf2 of the RF2 signal SIGrf2.

If the received signal strength indicator RSSIrf1 of the RF1 signal SIGrf1 is higher than or equal to the received signal strength indicator RSSIrf2 of the RF2 signal SIGrf2 (YES in Step S103), in Step S104, the communication terminal device 1 makes reception setting to the first RF module (RF1) 2a using the received signal strength indicator RSSIrf1 of the RF1 signal SIGrf1 as a received signal strength indicator RSSIrf in the communication terminal device 1. The communication terminal device 1 performs a functional operation (for example, an XR functional operation) based on the RF1 signal SIGrf1 received by the first RF module (RF1) 2a.

If the received signal strength indicator RSSIrf1 of the RF1 signal SIGrf1 is lower than the received signal strength indicator RSSIrf2 of the RF2 signal SIGrf2 (NO in Step S103), in Step S105, the communication terminal device 1 makes the reception setting to the second RF module (RF2) 2b using the received signal strength indicator RSSIrf2 of the RF2 signal SIGrf2 as the received signal strength indicator RSSIrf in the communication terminal device 1. The communication terminal device 1 performs the functional operation (for example, the XR functional operation) based on the RF2 signal SIGrf2 received by the second RF module (RF2) 2b.

In the present disclosure, each of the communication terminal devices 1_1, 1_2, . . . , and 1_n relays the reception signal in response to the request to perform retransmission (repeat transmission), as described above. In this repeater operation, the retransmission (the repeat transmission) of the reception signal is performed by the RF module, among the first RF module (RF1) 2a and the second RF module (RF2) 2b, which does not perform the reception operation through the diversity operation.

An operational concept of the communication terminal device according to the first embodiment will now be described.

For example, when the state is supposed in which the many communication terminal devices 1_1, 1_2, . . . , and 1_n are concurrently connected, for example, in which a variety of information is broadcasted from the radio base station 200 to the multiple communication terminal devices 1_1, 1_2, . . . , and 1_n within a certain area, such as a concert hall or a playing field, for example, a stadium, the received signal strength indicator may be reduced due to an obstacle, such as a structure, for example, a pillar on the floor or a human body, to inhibit an excellent communication state from being kept.

In the present disclosure, a radio signal that is received is relayed to the communication terminal device 1, which is, for example, a glasses-type wearable communication terminal device, to perform the retransmission (the repeat transmission). Accordingly, if the communication quality is reduced in any of the multiple communication terminal devices 1_1, 1_2, . . . , and 1_n, the radio signal is relayed by an external communication terminal device 1 in which the communication quality is not reduced to perform the retransmission (the repeat transmission). Consequently, it is possible to keep the excellent communication quality in each of the communication terminal devices 1_1, 1_2, . . . , and 1_n.

Operations of the communication terminal device 1 according to the first embodiment described above will now be described with reference to FIG. 6 and FIG. 7.

Figure 6:
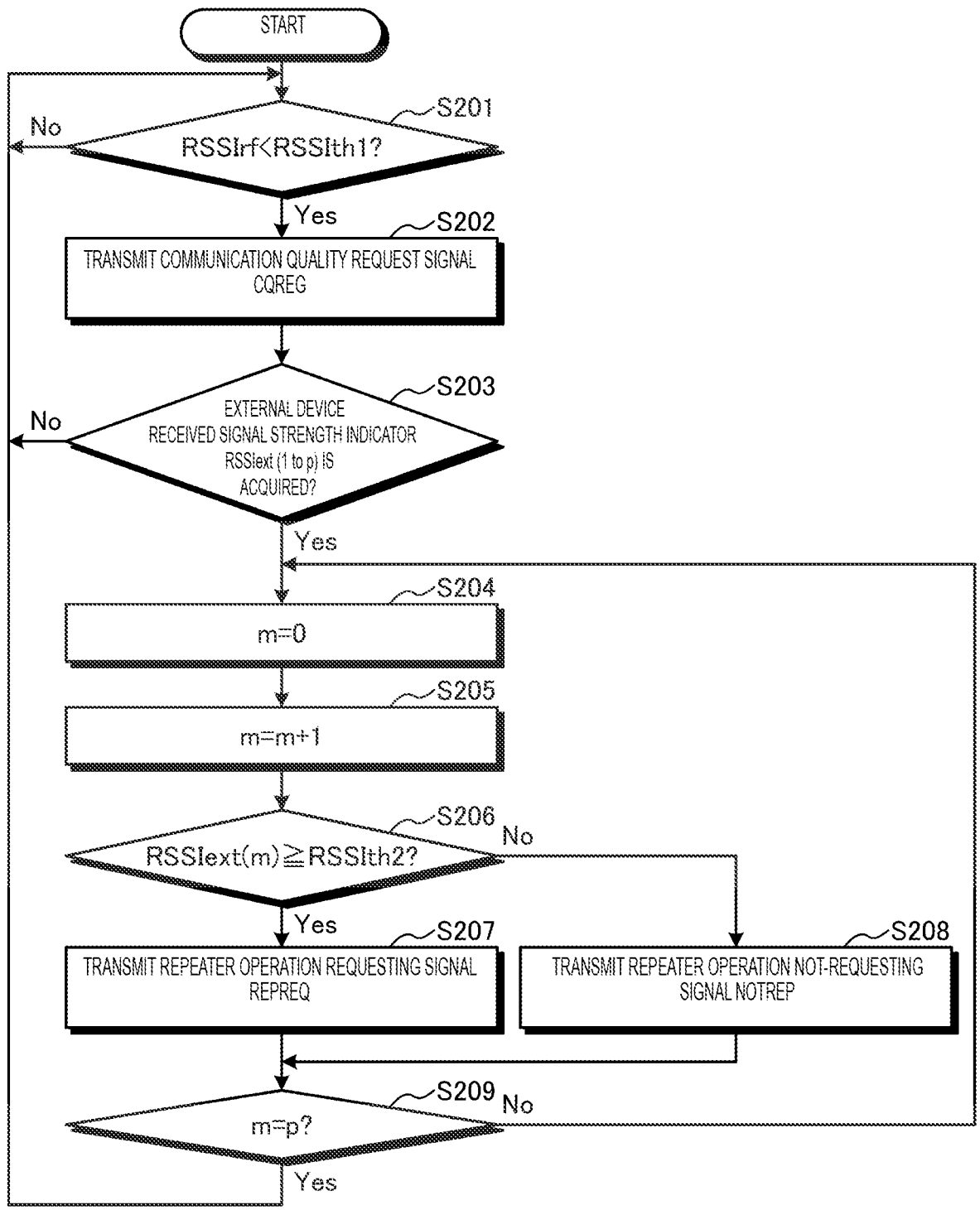
FIG. 6 is a flowchart illustrating an example of a repeater operation requesting process in the communication terminal device according to the first embodiment.

FIG. 6 is a flowchart illustrating an example of a repeater operation requesting process in the communication terminal device according to the first embodiment. FIG. 7 is a flowchart illustrating an example of a repeater operation process in the communication terminal device according to the first embodiment.

First, the repeater operation requesting process in the communication terminal device 1 according to the first embodiment will be described.

Referring to FIG. 6, in Step S201, the communication terminal device 1 determines whether the received signal strength indicator RSSIrf of the communication terminal device is lower than a predetermined communication terminal device received signal strength indicator threshold value (a first threshold value) RSSIth1. Here, the communication terminal device received signal strength indicator threshold value (the first threshold value) RSSIth1 is a threshold value used to determine whether the received signal strength indicator necessary for performing the functional operation (for example, the XR functional operation) of the communication terminal device in the communication terminal device 1 is achieved. Specifically, if the received signal strength indicator RSSIrf of the communication terminal device is higher than or equal to the communication terminal device received signal strength indicator threshold value (the first threshold value) RSSIth1 (NO in Step S201), the communication terminal device 1 determines that the received signal strength indicator necessary and sufficient for performing the functional operation (for example, the XR functional operation) of the communication terminal device in the communication terminal device 1 is achieved.

If the received signal strength indicator RSSIrf of the communication terminal device is higher than or equal to the communication terminal device received signal strength indicator threshold value (the first threshold value) RSSIth1 (NO in Step S201), the process repeats Step S201. If the received signal strength indicator RSSIrf of the communication terminal device is lower than the communication terminal device received signal strength indicator threshold value (the first threshold value) RSSIth1 (YES in Step S201), in Step S202, the communication terminal device 1 transmits a communication quality request signal CQREQ to an external communication terminal device 1. The external communication terminal device 1 is hereinafter simply referred to as an "external device".

The external device transmits the received signal strength indicator RSSIrf in the external device upon reception of the communication quality request signal CQREQ.

The communication terminal device 1 acquires the received signal strength indicator RSSIrf transmitted from the external device as an external device received signal strength indicator RSSIext (1 to p). Specifically, in Step S203, the communication terminal device 1 determines whether the external device received signal strength indicator RSSIext (1 to p) is acquired. Here, the communication terminal device 1 numbers the external devices that have transmitted the received signal strength indicators from "1" to "p" (p is a natural number not higher than n) and stores the external device received signal strength indicators RSSIext (1 to p) for the respective external devices "1", "2", . . . , and "p". Specifically, the communication terminal device 1 sequentially stores the received signal strength indicator of the external device "1" as "RSSIext(1)", the received signal strength indicator of the external device "2" as "RSSIext(2)", . . . , and the received signal strength indicator of the external device "p" as "RSSIext(p)".

If the external device received signal strength indicator RSSIext (1 to p) is not acquired (NO in Step S203), the process goes back to Step S201 to repeat Step S201 to Step S203.

If the external device received signal strength indicator RSSIext (1 to p) is acquired (YES in Step S203), in Step S204, the communication terminal device 1 resets a counter value m to zero. Here, the counter value m indicates the number of the external device that has acquired the external device received signal strength indicator RSSIext (1 to p).

In Step S205, the communication terminal device 1 increments the counter value m by one. In Step S206, the communication terminal device 1 determines whether a received signal strength indicator RSSIext(m) of an external device "m" is higher than or equal to an external device received signal strength indicator threshold value (a second threshold value) RSSIth2. Here, the external device received signal strength indicator threshold value (the second threshold value) RSSIth2 is a threshold value used to determine whether the received signal strength indicator necessary for performing the functional operation (for example, the XR functional operation) of the communication terminal device in the external communication terminal device 1 and performing the retransmission of the reception signal to the external device is achieved. Specifically, in Step S206, if the received signal strength indicator RSSIext(m) of the external device "m" is higher than or equal to the external device received signal strength indicator threshold value (the second threshold value) RSSIth2 (YES in Step S206), the communication terminal device 1 determines that the received signal strength indicator necessary and sufficient for performing the functional operation (for example, the XR functional operation) of the external device in the external device "m" and performing the retransmission of the reception signal to the external device is achieved.

If the received signal strength indicator RSSIext(m) of the external device "m" is higher than or equal to the external device received signal strength indicator threshold value (the second threshold value) RSSIth2 (YES in Step S206), in Step S207, the communication terminal device 1 transmits a repeater operation requesting signal REPREQ to the external device "m".

If the received signal strength indicator RSSIext(m) of the external device "m" is lower than the external device received signal strength indicator threshold value (the second threshold value) RSSIth2 (NO in Step S206), in Step S208, the communication terminal device 1 transmits a repeater operation not-requesting signal NOTREP to the external device "m".

In Step S209, the communication terminal device 1 determines whether the counter value m is equal to p. If the counter value m is not equal to p (NO in Step S209), the process goes back to Step S204 to repeat Step S204 to Step S209 until the counter value m is equal to p (YES in Step S209). The repeater operation requesting signal is transmitted to the external device having the received signal strength indicator RSSIrf higher than or equal to the communication terminal device received signal strength indicator threshold value (the first threshold value) RSSIth1 in the above manner.

The communication terminal device received signal strength indicator threshold value (the first threshold value) RSSIth1 in Step S201 may be equal to the external device received signal strength indicator threshold value (the second threshold value) RSSIth2 in Step S206 or the communication terminal device received signal strength indicator threshold value (the first threshold value) RSSIth1 in Step S201 may be different from the external device received signal strength indicator threshold value (the second threshold value) RSSIth2 in Step S206. However, the magnitude relationship between the communication terminal device received signal strength indicator threshold value (the first threshold value) RSSIth1 and the external device received signal strength indicator threshold value (the second threshold value) RSSIth2 is desirably RSSIth1<RSSIth2 in terms of that the communication terminal device 1 having the enough received signal in the communication terminal device is caused to perform a repeater operation. The repeater operation request is capable of being submitted to the communication terminal device 1 having the enough received signal in the communication terminal device in the above manner.

Next, the repeater operation process in the communication terminal device 1 according to the first embodiment will be described.

Figure 7:
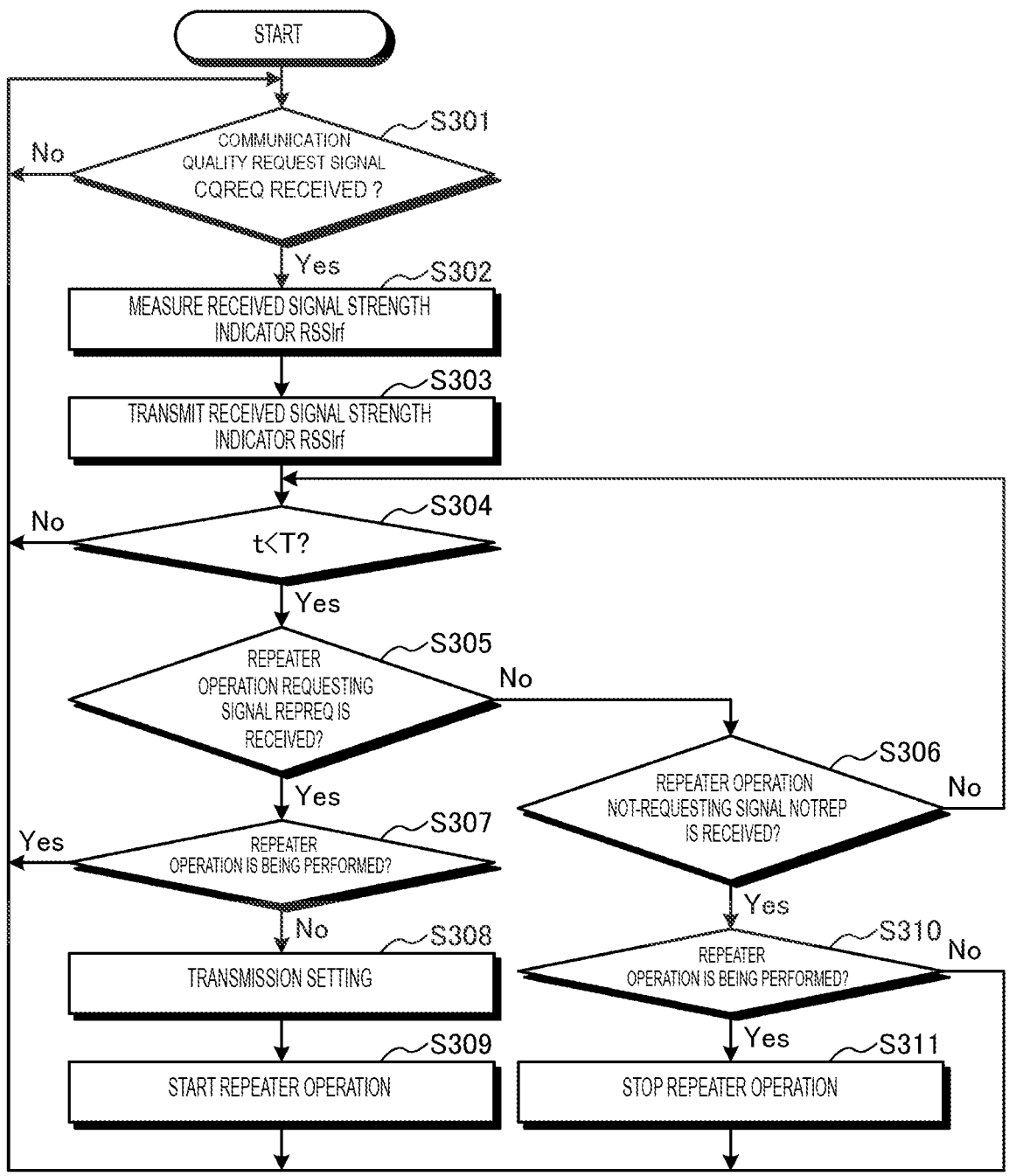
FIG. 7 is a flowchart illustrating an example of a repeater operation process in the communication terminal device according to the first embodiment.

Referring to FIG. 7, in Step S301, the communication terminal device 1 determines whether the communication quality request signal CQREQ is received from the external device.

If the communication quality request signal CQREQ is not received (NO in Step S301), the process repeats Step S301.

If the communication quality request signal CQREQ is received (YES in Step S301), in Step S302, the communication terminal device 1 measures the received signal strength indicator RSSIrf in the communication terminal device. In Step S303, the communication terminal device 1 transmits the received signal strength indicator RSSIrf in the communication terminal device to the external device that has transmitted the communication quality request signal CQREQ. When the received signal strength indicator RSSIrf measured in the diversity operation (refer to FIG. 5) described above is held, an aspect may be supposed in which Step S302 is omitted and, in Step S303, the received signal strength indicator RSSIrf held in the communication terminal device is transmitted.

In Step S304, the communication terminal device 1 determines whether an elapsed time t since the received signal strength indicator RSSIrf is transmitted is shorter than a predetermined time T. During a certain time period in which the elapsed time t since the received signal strength indicator RSSIrf is transmitted is shorter than the predetermined time T (YES in Step S304), in Step S305, the communication terminal device 1 determines whether the repeater operation requesting signal REPREQ from the external device is received. If the repeater operation requesting signal REPREQ from the external device is not received (NO in Step S305), in Step S306, the communication terminal device 1 determines whether the repeater operation not-requesting signal NOTREP from the external device is received. If the repeater operation not-requesting signal NOTREP from the external device is not received (NO in Step S306), Step S304 and the subsequent steps are repeated until the elapsed time t since the received signal strength indicator RSSIrf is transmitted is longer than or equal to the predetermined time T (NO in Step S304). If the elapsed time t since the received signal strength indicator RSSIrf is transmitted is longer than or equal to the predetermined time T (NO in Step S304), the process goes back to Step S301 to repeat Step S301 and the subsequent steps.

If the repeater operation requesting signal REPREQ from the external device is received (YES in Step S305), in Step S307, the communication terminal device 1 determines whether the communication terminal device is performing the repeater operation.

If the communication terminal device is performing the repeater operation (YES in Step S307), the process goes back to Step S301 to repeat Step S301 and the subsequent steps.

If the communication terminal device is not performing the repeater operation (NO in Step S307), in Step S308, the communication terminal device 1 makes transmission setting to the RF module for which the reception setting is not made in the diversity operation (refer to FIG. 5) described above. In Step S309, the communication terminal device 1 starts the repeater operation. Specifically, when the reception setting is made to the first RF module (RF1) 2*a* in the diversity operation (refer to FIG. 5) described above, the communication terminal device 1 makes the transmission setting to the second RF module (RF2) 2*b*. Alternatively, when the reception setting is made to the second RF module (RF2) 2*b* in the diversity operation (refer to FIG. 5) described above, the communication terminal device 1 makes the transmission setting to the first RF module (RF1) 2*a*.

If the repeater operation not-requesting signal NOTREP from the external device is received (YES in Step S306), in Step S310, the communication terminal device 1 determines whether the communication terminal device is performing the repeater operation.

If the communication terminal device is not performing the repeater operation (NO in Step S310), the process goes back to Step S301 to repeat Step S301 and the subsequent steps.

If the communication terminal device is performing the repeater operation (YES in Step S310), in Step S311, the communication terminal device 1 cancels the transmission setting of the RF module for which the transmission setting is made and stops the repeater operation. Specifically, when the transmission setting is made to the first RF module (RF1) 2*a*, the communication terminal device 1 cancels the transmission setting of the first RF module (RF1) 2*a* and stops the repeater operation. Alternatively, when the transmission setting is made to the second RF module (RF2) 2*b*, the communication terminal device 1 cancels the transmission setting of the second RF module (RF2) 2*b* and stops the repeater operation.

With the above process, the start of the repeater operation based on the repeater operation requesting signal REPREQ (Step S309) has priority over the stop of the repeater operation based on the repeater operation not-requesting signal NOTREP (Step S311). In other words, if the external device that is transmitting the repeater operation requesting signal REPREQ exists even when the multiple external devices are transmitting the repeater operation not-requesting signal NOTREP, the repeater operation based on the repeater operation requesting signal REPREQ is started in Step S309.

Performing the respective processes illustrated in FIG. 5, FIG. 6, and FIG. 7 in each of the communication terminal devices 1_1, 1_2, . . . , and 1_*n* arranged in the coverage area 300 of the radio base station 200 improves the communication quality in the coverage area 300 to keep the excellent communication state. In other words, it is possible to improve the robustness of communication (improve the trouble resistance, that is, stabilize the communication quality) when the many communication terminal devices 1_1, 1_2, . . . , and 1_*n* are concurrently connected in the coverage area 300 of the radio base station 200.

Examples of specific processes in the communication system according to the first embodiment will now be described.

Figure 8:
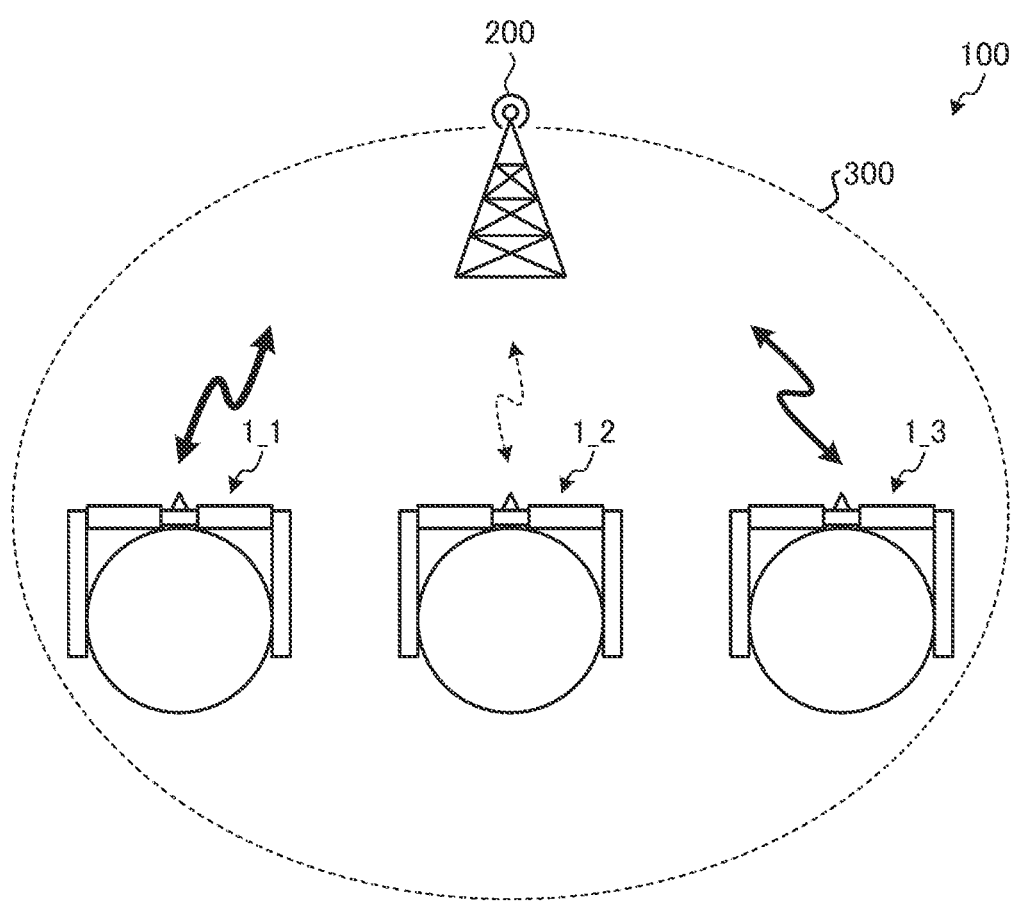
FIG. 8 is a conceptual diagram for describing a first specific processing example in the communication system according to the first embodiment.
Figure 9:
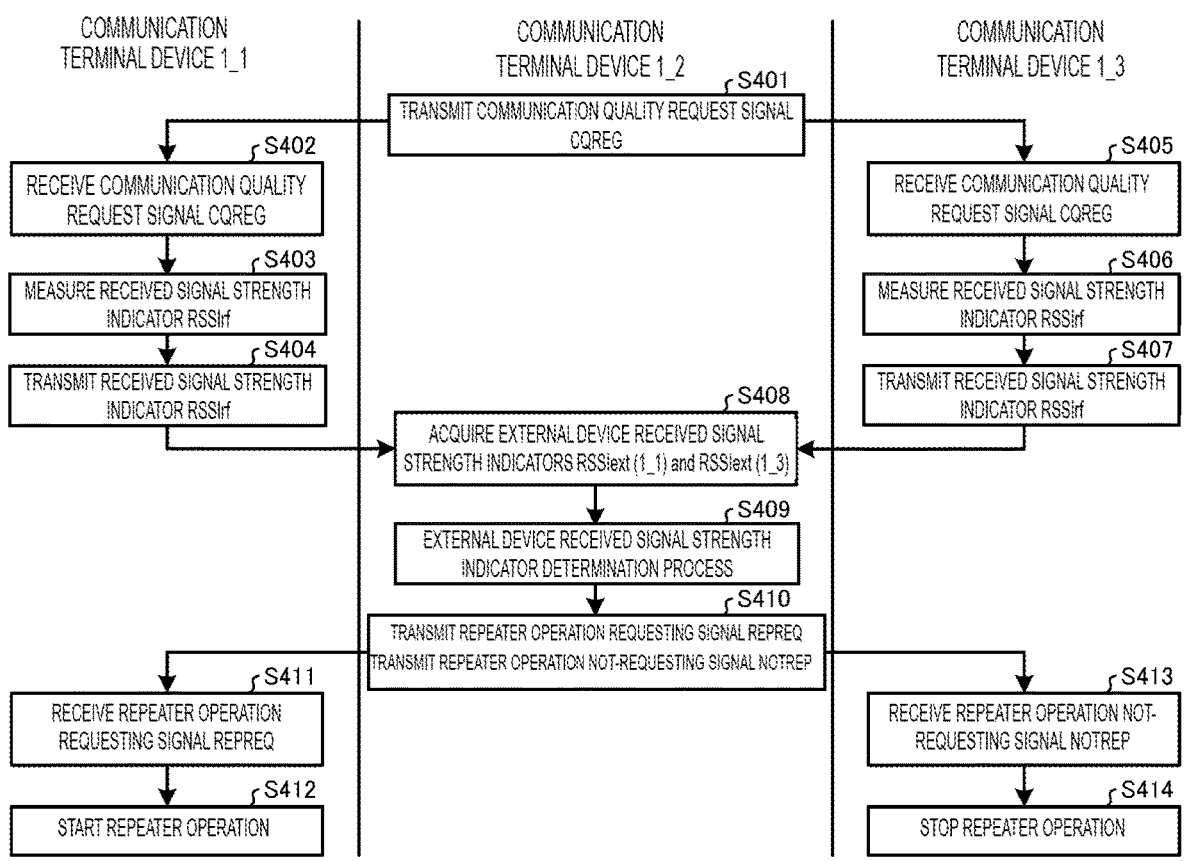
FIG. 9 is a flowchart illustrating the first specific processing example in the communication system according to the first embodiment.

FIG. 8 is a conceptual diagram for describing a first specific processing example in the communication system according to the first embodiment. FIG. 9 is a flowchart illustrating the first specific processing example in the communication system according to the first embodiment.

Referring to FIG. 8, the three communication terminal devices 1_1, 1_2, and 1_3 in the coverage area 300 of the radio base station 200 are illustrated as examples.

It is assumed that the received signal strength indicator RSSIrf of the communication terminal device is higher than or equal to the communication terminal device received signal strength indicator threshold value (the first threshold value) RSSIth1 (NO in Step S201) in the flowchart illustrated in FIG. 6 in the communication terminal devices 1_1 and 1_3 and that each of the communication terminal devices 1_1 and 1_3 is performing the functional operation (for example, the XR functional operation) based on the RF1 signal SIGrf1 (or the RF2 signal SIGrf2) of the communication terminal device. It is assumed that the received signal strength indicator RSSIrf of the communication terminal device 1_1, that is, the external device received signal strength indicator RSSIext (1_1) in the communication terminal device 1_2 is higher than or equal to the external device received signal strength indicator threshold value (the second threshold value) RSSIth2 and that the received signal strength indicator RSSIrf of the communication terminal device 1_3, that is, the external device received signal strength indicator RSSIext (1_3) in the communication terminal device 1_2 is lower than the external device received signal strength indicator threshold value (the second threshold value) RSSIth2.

It is assumed that the received signal strength indicator RSSIrf of the communication terminal device is lower than the communication terminal device received signal strength indicator threshold value (the first threshold value) RSSIth1 (YES in Step S201) in the flowchart illustrated in FIG. 6 in the communication terminal device 1_2 and the retransmission (the repeat transmission) of the radio signal by the communication terminal device 1_1 or the communication terminal device 1_3 is required.

Referring to FIG. 9, in Step S401, the communication terminal device 1_2 transmits the communication quality request signal CQREQ to the communication terminal device 1_1 and the communication terminal device 1_3 in Step S202 in the flowchart illustrated in FIG. 6.

In Step S402, the communication terminal device 1_1 receives the communication quality request signal CQREQ from the communication terminal device 1_2 in Step S301 in the flowchart illustrated in FIG. 7. In Step S403, the communication terminal device 1_1 measures the received signal strength indicator RSSIrf of the communication terminal device in Step S302 in the flowchart illustrated in FIG. 7. In Step S404, the communication terminal device 1_1 transmits the measured received signal strength indicator RSSIrf to the communication terminal device 1_2 in Step S303 in the flowchart illustrated in FIG. 7.

In Step S405, the communication terminal device 1_3 receives the communication quality request signal CQREQ from the communication terminal device 1_2 in Step S301 in the flowchart illustrated in FIG. 7. In Step S406, the communication terminal device 1_3 measures the received signal strength indicator RSSIrf of the communication terminal device in Step S302 in the flowchart illustrated in FIG. 7. In Step S407, the communication terminal device 1_3 transmits the measured received signal strength indicator RSSIrf to the communication terminal device 1_2 in Step S303 in the flowchart illustrated in FIG. 7.

In Step S408, the communication terminal device 1_2 receives the received signal strength indicator RSSIrf from the communication terminal device 1_1 to acquire the received signal strength indicator RSSIrf as the external device received signal strength indicator RSSIext (1_1) and receives the received signal strength indicator RSSIrf from the communication terminal device 1_3 to acquire the received signal strength indicator RSSIrf as the external device received signal strength indicator RSSIext (1_3) in Step S203 in the flowchart illustrated in FIG. 6.

In Step S409, the communication terminal device 1_2 performs, for example, Step S204 to Step S206 in the flowchart illustrated in FIG. 6 as an external device received signal strength indicator determination process. The external device received signal strength indicator RSSIext (1_1) of the communication terminal device 1_1 is higher than or equal to the external device received signal strength indicator threshold value (the second threshold value) RSSIth2 (YES in Step S206), and it is determined that the communication terminal device 1_1 is a target of the repeater operation request. The external device received signal strength indicator RSSIext (1_3) of the communication terminal device 1_3 is lower than the external device received signal strength indicator threshold value (the second threshold value) RSSIth2 (NO in Step S206), and it is determined that the communication terminal device 1_3 is not a target of the repeater operation request.

In Step S410, the communication terminal device 1_2 transmits the repeater operation requesting signal REPREQ to the communication terminal device 1_1 in Step S207 in the flowchart illustrated in FIG. 6 and transmits the repeater operation not-requesting signal NOTREP to the communication terminal device 1_3 in Step S208 in the flowchart illustrated in FIG. 6.

In Step S411, the communication terminal device 1_1 receives the repeater operation requesting signal REPREQ from the communication terminal device 1_2 in Step S305 in the flowchart illustrated in FIG. 7. In Step S412, the communication terminal device 1_1 makes the transmission setting to the RF module for which the reception setting is not made in the diversity operation (refer to FIG. 5) described above in Step S308 in the flowchart illustrated in FIG. 7 if the repeater operation is not being performed in Step S307 in the flowchart illustrated in FIG. 7 to start the repeater operation.

In Step S413, the communication terminal device 1_3 receives the repeater operation not-requesting signal NOTREP transmitted from the communication terminal device 1_2 in Step S306 in the flowchart illustrated in FIG. 7. In Step S414, the communication terminal device 1_3 stops the repeater operation in Step S311 in the flowchart illustrated in FIG. 7 if the repeater operation is being performed in Step S310 in the flowchart illustrated in FIG. 7.

With the above process, it is possible to improve the communication quality of the communication terminal device 1_2 to keep the excellent communication state.

Figure 10:
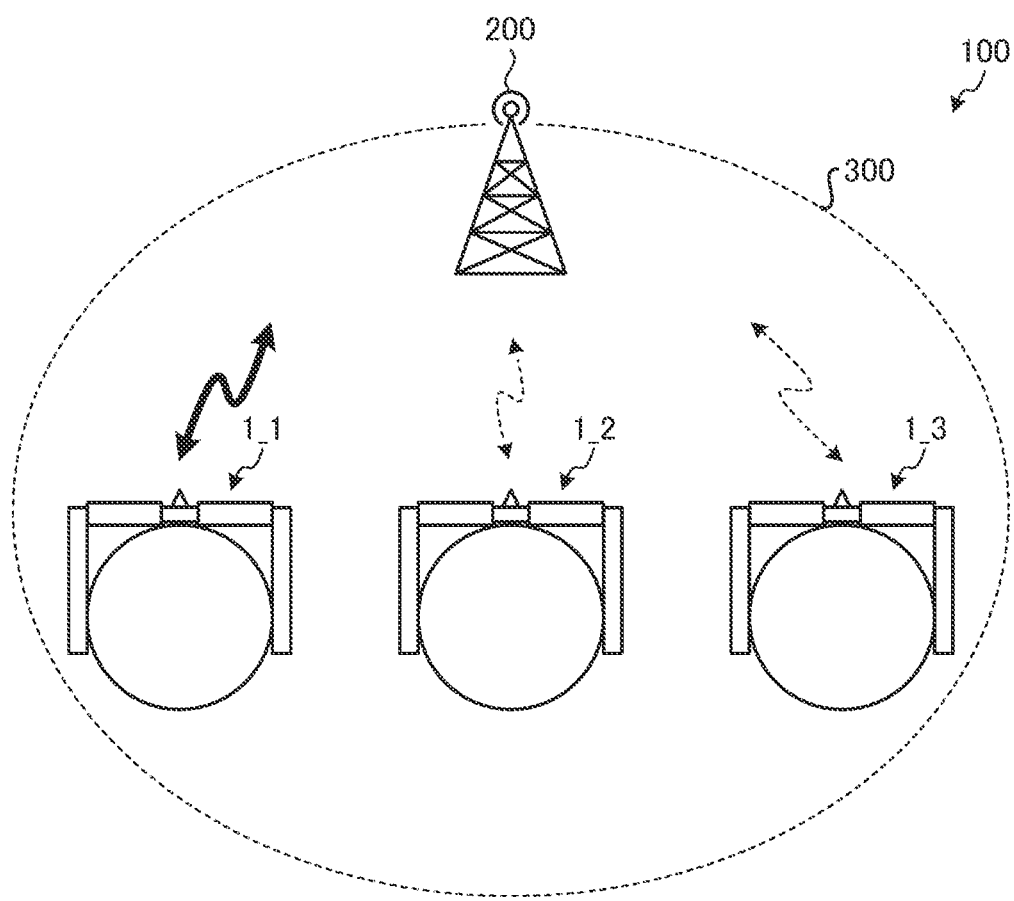
FIG. 10 is a conceptual diagram for describing a second specific processing example in the communication system according to the first embodiment.
Figure 11:
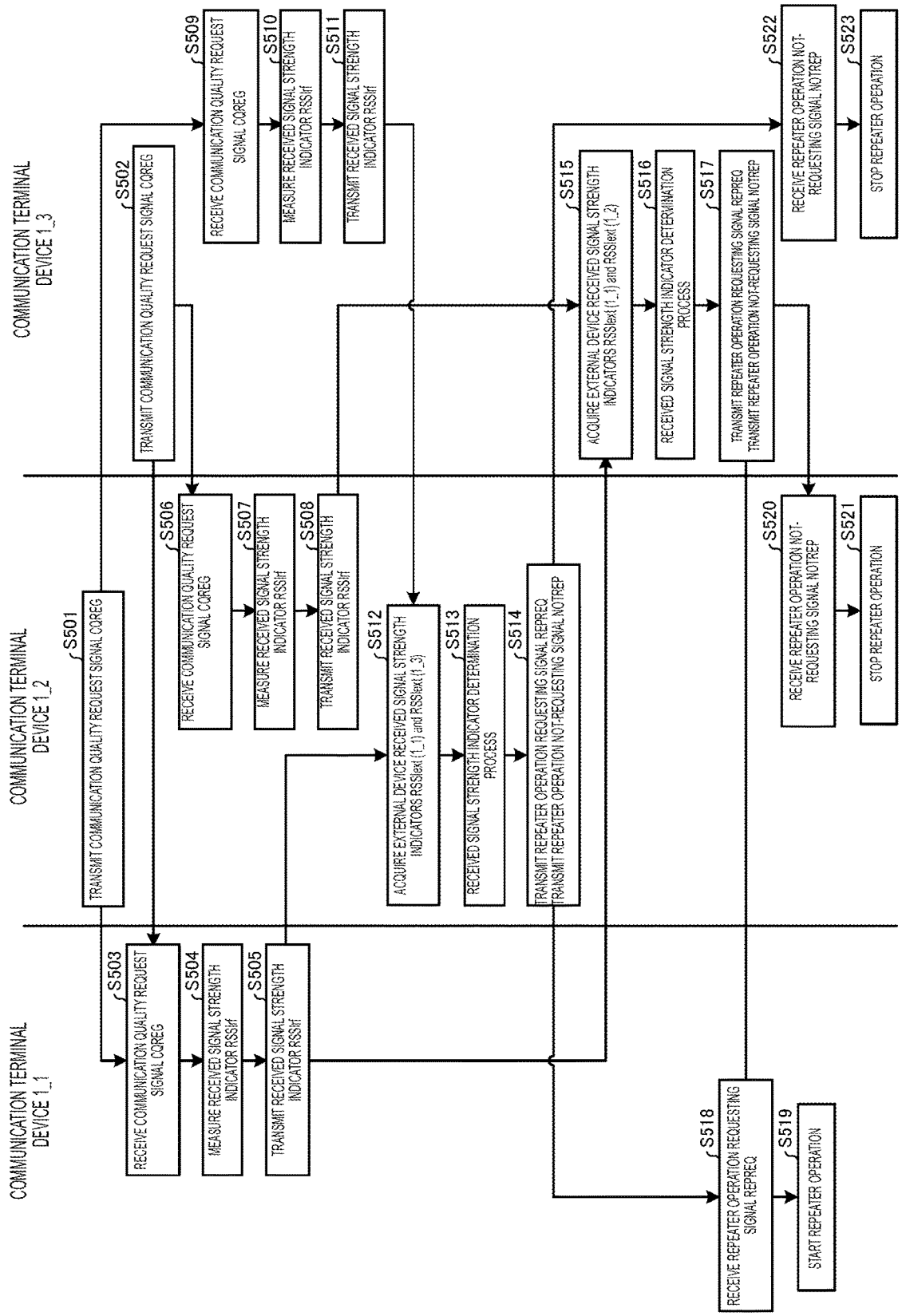
FIG. 11 is a flowchart illustrating the second specific processing example in the communication system according to the first embodiment.

FIG. 10 is a conceptual diagram for describing a second specific processing example in the communication system according to the first embodiment. FIG. 11 is a flowchart illustrating the second specific processing example in the communication system according to the first embodiment.

Referring to FIG. 10, the three communication terminal devices 1_1, 1_2, and 1_3 in the coverage area 300 of the radio base station 200 are illustrated as examples, as in the first processing example described above.

It is assumed that the received signal strength indicator RSSIrf of the communication terminal device is higher than or equal to the communication terminal device received signal strength indicator threshold value (the first threshold value) RSSIth1 (NO in Step S201) in the flowchart illustrated in FIG. 6 in the communication terminal device 1_1 and that the communication terminal device 1_1 is performing the functional operation (for example, the XR functional operation) based on the RF1 signal SIGrf1 (or the RF2 signal SIGrf2) of the communication terminal device. It is assumed that the received signal strength indicator RSSIrf of the communication terminal device 1_1, that is, the external device received signal strength indicator RSSIext (1_1) in the communication terminal device 1_2 is higher than or equal to the external device received signal strength indicator threshold value (the second threshold value) RSSIth2.

It is assumed that the received signal strength indicator RSSIrf of the communication terminal device is lower than the communication terminal device received signal strength indicator threshold value (the first threshold value) RSSIth1 (YES in Step S201) in the flowchart illustrated in FIG. 6 in the communication terminal devices 1_2 and 1_3 and the retransmission (the repeat transmission) of the radio signal by the communication terminal device 1_1 is required.

Referring to FIG. 11, in Step S501, the communication terminal device 1_2 transmits the communication quality request signal CQREQ to the communication terminal devices 1_1 and 1_3 in Step S202 in the flowchart illustrated in FIG. 6.

In Step S502, the communication terminal device 1_3 transmits the communication quality request signal CQREQ to the communication terminal devices 1_1 and 1_2 in Step S202 in the flowchart illustrated in FIG. 6.

In Step S503, the communication terminal device 1_1 receives the communication quality request signals CQREQ from the communication terminal devices 1_2 and 1_3 in Step S301 in the flowchart illustrated in FIG. 7. In Step S504, the communication terminal device 1_1 measures the received signal strength indicator RSSIrf of the communication terminal device in Step S302 in the flowchart illustrated in FIG. 7. In Step S505, the communication terminal device 1_1 transmits the received signal strength indicator RSSIrf to the communication terminal devices 1_2 and 1_3 in Step S303 in the flowchart illustrated in FIG. 7.

In Step S506, the communication terminal device 1_2 receives the communication quality request signals CQREQ from the communication terminal devices 1_1 and 1_3 in Step S301 in the flowchart illustrated in FIG. 7. In Step S507, the communication terminal device 1_2 measures the received signal strength indicator RSSIrf of the communication terminal device in Step S302 in the flowchart illustrated in FIG. 7. In Step S508, the communication terminal device 1_2 transmits the received signal strength indicator RSSIrf to the communication terminal devices 1_1 and 1_3 in Step S303 in the flowchart illustrated in FIG. 7.

In Step S509, the communication terminal device 1_3 receives the communication quality request signals CQREQ from the communication terminal devices 1_1 and 1_2 in Step S301 in the flowchart illustrated in FIG. 7. In Step S510, the communication terminal device 1_3 measures the received signal strength indicator RSSIrf of the communication terminal device in Step S302 in the flowchart illustrated in FIG. 7. In Step S511, the communication terminal device 1_3 transmits the received signal strength indicator RSSIrf to the communication terminal devices 1_1 and 1_2 in Step S303 in the flowchart illustrated in FIG. 7.

In Step S512, the communication terminal device 1_2 receives the received signal strength indicator RSSIrf from the communication terminal device 1_1 to acquire the received signal strength indicator RSSIrf as the external device received signal strength indicator RSSIext (1_1) and receives the received signal strength indicator RSSIrf from the communication terminal device 1_3 to acquire the received signal strength indicator RSSIrf as the external device received signal strength indicator RSSIext (1_3) in Step S203 in the flowchart illustrated in FIG. 6.

In Step S513, the communication terminal device 1_2 performs, for example, Step S204 to Step S206 in the flowchart illustrated in FIG. 6 as the external device received signal strength indicator determination process. The external device received signal strength indicator RSSIext (1_1) of the communication terminal device 1_1 is higher than or equal to the external device received signal strength indicator threshold value (the second threshold value) RSSIth2 (YES in Step S206), and it is determined that the communication terminal device 1_1 is a target of the repeater operation request. The external device received signal strength indicator RSSIext (1_3) of the communication terminal device 1_3 is lower than the external device received signal strength indicator threshold value (the second threshold value) RSSIth2 (NO in Step S206), and it is determined that the communication terminal device 1_3 is not a target of the repeater operation request.

In Step S514, the communication terminal device 1_2 transmits the repeater operation requesting signal REPREQ to the communication terminal device 1_1 in Step S207 in the flowchart illustrated in FIG. 6 and transmits the repeater operation not-requesting signal NOTREP to the communication terminal device 1_3 in Step S208 in the flowchart illustrated in FIG. 6.

In Step S515, the communication terminal device 1_3 receives the received signal strength indicator RSSIrf from the communication terminal device 1_1 to acquire the received signal strength indicator RSSIrf as the external device received signal strength indicator RSSIext (1_1) and receives the received signal strength indicator RSSIrf from the communication terminal device 1_2 to acquire the received signal strength indicator RSSIrf as the external device received signal strength indicator RSSIext (1_2) in Step S203 in the flowchart illustrated in FIG. 6.

In Step S516, the communication terminal device 1_3 performs, for example, Step S204 to Step S206 in the flowchart illustrated in FIG. 6 as the external device received signal strength indicator determination process. The external device received signal strength indicator RSSIext (1_1) of the communication terminal device 1_1 is higher than or equal to the external device received signal strength indicator threshold value (the second threshold value) RSSIth2 (YES in Step S206), and it is determined that the communication terminal device 1_1 is a target of the repeater operation request. The external device received signal strength indicator RSSIext (1_2) of the communication terminal device 1_2 is lower than the external device received signal strength indicator threshold value (the second threshold value) RSSIth2 (NO in Step S206), and it is determined that the communication terminal device 1_2 is not a target of the repeater operation request.

In Step S517, the communication terminal device 1_3 transmits the repeater operation requesting signal REPREQ to the communication terminal device 1_1 in Step S207 in the flowchart illustrated in FIG. 6 and transmits the repeater operation not-requesting signal NOTREP to the communication terminal device 1_2 in Step S208 in the flowchart illustrated in FIG. 6.

In Step S518, the communication terminal device 1_1 receives the repeater operation requesting signals REPREQ from the communication terminal devices 1_2 and 1_3 in Step S305 in the flowchart illustrated in FIG. 7. In Step S519, the communication terminal device 1_1 makes the transmission setting to the RF module for which the reception setting is not made in the diversity operation (refer to FIG. 5) described above in Step S308 in the flowchart illustrated in FIG. 7 if the repeater operation is not being performed in Step S307 in the flowchart illustrated in FIG. 7 to start the repeater operation.

In Step S520, the communication terminal device 1_2 receives the repeater operation not-requesting signal NOTREP transmitted from the communication terminal device 1_3 in Step S306 in the flowchart illustrated in FIG. 7. In Step S521, the communication terminal device 1_2 stops the repeater operation in Step S311 in the flowchart illustrated in FIG. 7 if the repeater operation is being performed in Step S310 in the flowchart illustrated in FIG. 7.

In Step S522, the communication terminal device 1_3 receives the repeater operation not-requesting signal NOTREP transmitted from the communication terminal device 1_2 in Step S306 in the flowchart illustrated in FIG. 7. In Step S523, the communication terminal device 1_3 stops the repeater operation in Step S311 in the flowchart illustrated in FIG. 7 if the repeater operation is being performed in Step S310 in the flowchart illustrated in FIG. 7.

With the above process, it is possible to improve the communication qualities of the communication terminal devices 1_2 and 1_3 to keep the excellent communication state.

Figure 12:
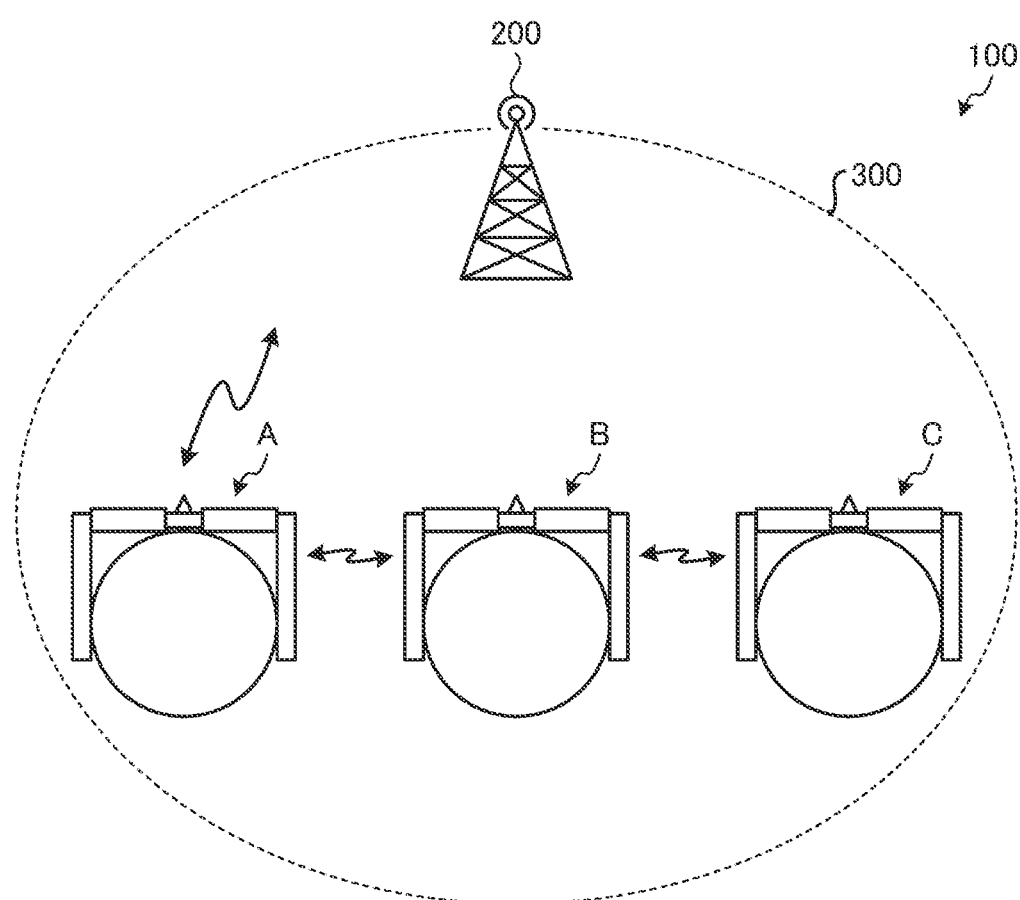
FIG. 12 is a conceptual diagram illustrating an example of a cooperative operation by the multiple communication terminal devices according to the first embodiment.

Complexly performing the processes illustrated in FIG. 5 to FIG. 7 by the multiple communication terminal devices 1 in the coverage area 300 of the radio base station 200 in cooperation with each other builds relay connection between the multiple communication terminal devices 1. FIG. 12 is a conceptual diagram illustrating an example of a cooperative operation by the multiple communication terminal devices according to the first embodiment.

As illustrated in FIG. 12, communication terminal devices A, B, and C in the coverage area 300 of the radio base station 200 perform the processes illustrated in FIG. 5 to FIG. 7 to build the relay connection, for example, in which the radio signal retransmitted by the communication terminal device A is further retransmitted by the communication terminal device B and the radio signal retransmitted by the communication terminal device B is received by the communication terminal device C. Building the relay connection through cooperation between the multiple communication terminal devices in the above manner enables the communication quality in the coverage area 300 of the radio base station 200 to be improved, thus improving the robustness of communication (improving the trouble resistance, that is, stabilizing the communication quality).

Second Embodiment

Figure 13:
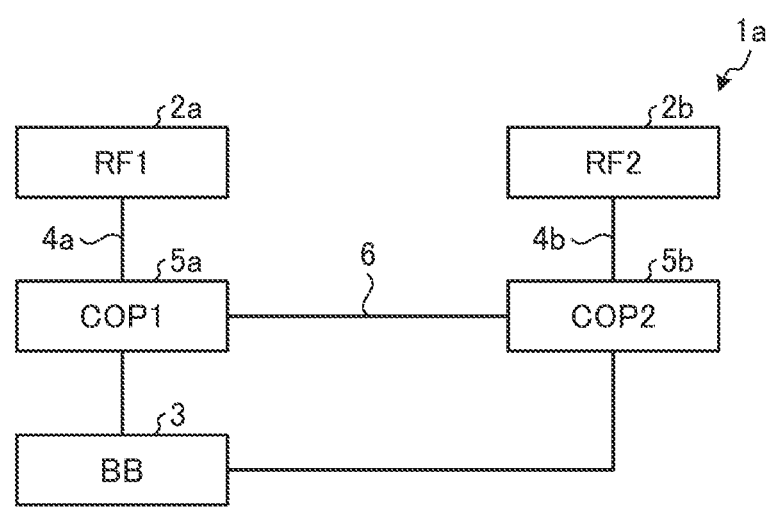
FIG. 13 is a diagram illustrating an example of the block configuration of a communication terminal device according to a second embodiment.

FIG. 13 is a diagram illustrating an example of the block configuration of a communication terminal device according to a second embodiment. As illustrated in FIG. 13, a communication terminal device 1*a* according to the second embodiment includes a first coupler circuit (COP1) 5*a* and a second coupler circuit 5*b* (COP2) 5*b*, in addition to the components of the first embodiment. Since the schematic configuration of the communication system 100 and the operational flowchart by the communication terminal device 1*a* are the same as those in the first embodiment, a description of the schematic configuration of the communication system 100 and the operational flowchart by the communication terminal device 1*a* is omitted herein. Although the block configuration illustrated in FIG. 13 is contrasted with the first examples illustrated in FIG. 2*a* and FIG. 4*a*, the block configuration illustrated in FIG. 13 may be contrasted with the second examples illustrated in FIG. 2*b* and FIG. 4*b*.

Figure 14A:
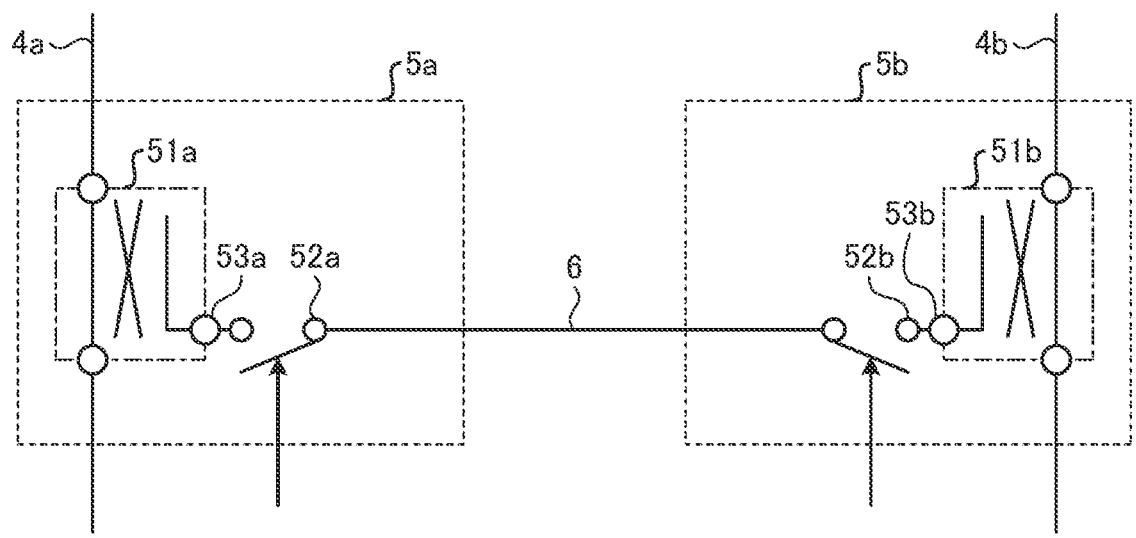
FIG. 14A is a first diagram illustrating an example of the block configurations of a first coupler circuit and a second coupler circuit according to the second embodiment.
Figure 14B:
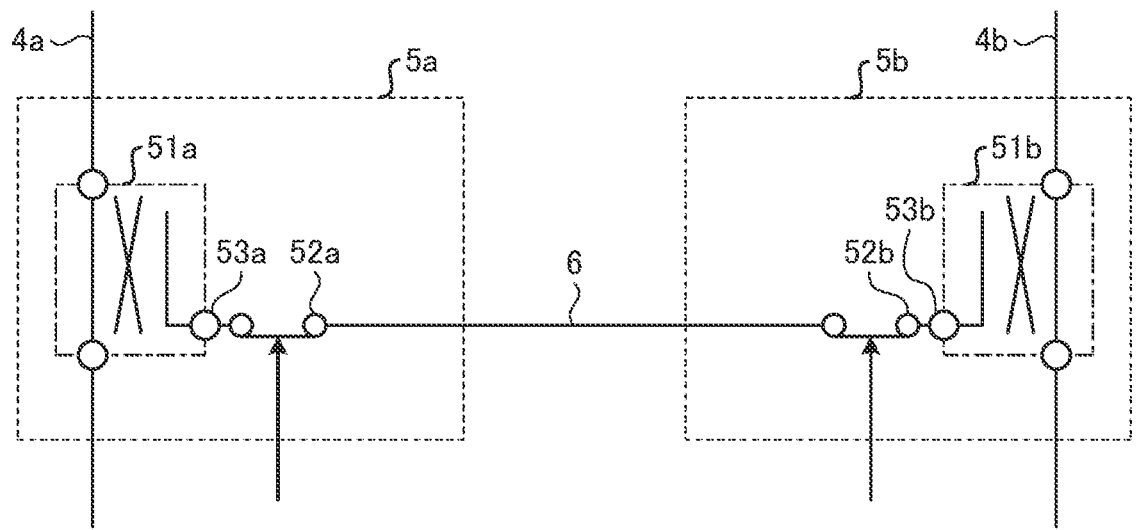
FIG. 14B is a second diagram illustrating the example of the block configurations of the first coupler circuit and the second coupler circuit according to the second embodiment.

FIG. 14*a* is a first diagram illustrating an example of the block configurations of the first coupler circuit 5*a* and the second coupler circuit 5b according to the second embodiment. FIG. 14b is a second diagram illustrating the example of the block configurations of the first coupler circuit 5a and the second coupler circuit 5b according to the second embodiment.

The first coupler circuit 5a includes a coupler 51a and a switch 52a.

The second coupler circuit 5b includes a coupler 51b and a switch 52b.

The first coupler circuit 5a and the second coupler circuit 5b may have, for example, an aspect in which the respective components are composed on a flexible substrate having flexibility or may have an aspect in which the respective components are composed on a dielectric substrate, as in the first RF module (RF1) 2a and the second RF module (RF2) 2b. The present disclosure is not limited to the specific configurations of the first coupler circuit 5a and the second coupler circuit 5b.

The IF signal on the communication line 4a is branched by the coupler 51a. The IF signal on the communication line 4b is branched by the coupler 51b. A branch terminal 53a of the coupler 51a is connected to a branch terminal 53b of the coupler 51b via the switches 52a and 52b with a communication line 6 interposed therebetween.

When the communication line 4a and the communication line 4b are metal cables, the communication line 6 is also desirably a metal cable. In this case, the coupler 51a and the coupler 51b are each composed of an RF passive element.

When the communication line 4a and the communication line 4b are optical fiber cables, the communication line 6 is also desirably an optical fiber cable. In this case, the coupler 51a and the coupler 51b are each composed of an optical fiber coupler.

The operation of the first coupler circuit 5a and the second coupler circuit 5b will now be described.

When the repeater operation is not performed in the communication terminal device 1a according to the second embodiment, the switches 52a and 52b are turned off, as illustrated in FIG. 14a. In contrast, when the repeater operation is performed in the communication terminal device 1a, the switches 52a and 52b are turned on, as illustrated in FIG. 14b. Specifically, when the transmission setting is made in Step S308 in the flowchart illustrated in FIG. 7, described in the first embodiment, the switches 52a and 52b are turned on. Accordingly, the repeater operation is capable of being performed via the communication line 6 not via the baseband module (BB) 3.

Third Embodiment

Figure 15:
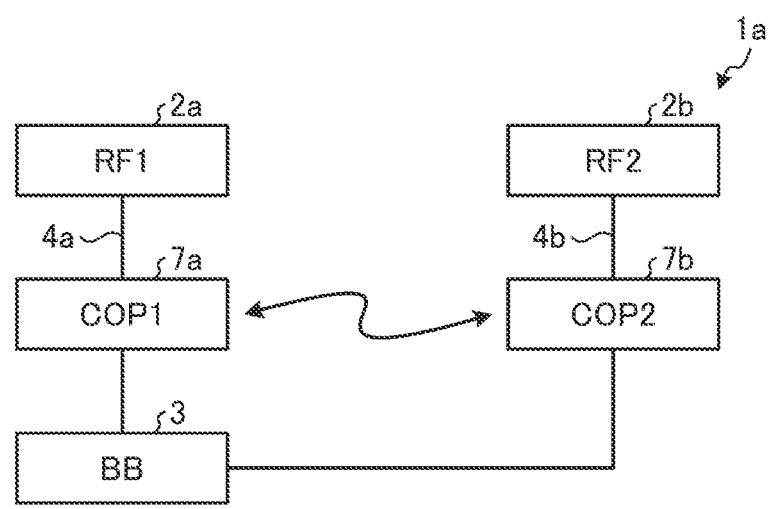
FIG. 15 is a diagram illustrating an example of the block configuration of a communication terminal device according to a third embodiment.

FIG. 15 is a diagram illustrating an example of the block configuration of a communication terminal device according to a third embodiment. As illustrated in FIG. 15, a communication terminal device 1b according to the third embodiment has a configuration in which communication is established between a first coupler circuit (COP1) 7a and a second coupler circuit (COP2) 7b to perform the repeater operation. Since the schematic configuration of the communication system 100 and the operational flowchart by the communication terminal device 1b are the same as those in the first embodiment, a description of the schematic configuration of the communication system 100 and the operational flowchart by the communication terminal device 1b is omitted herein.

Figure 16A:
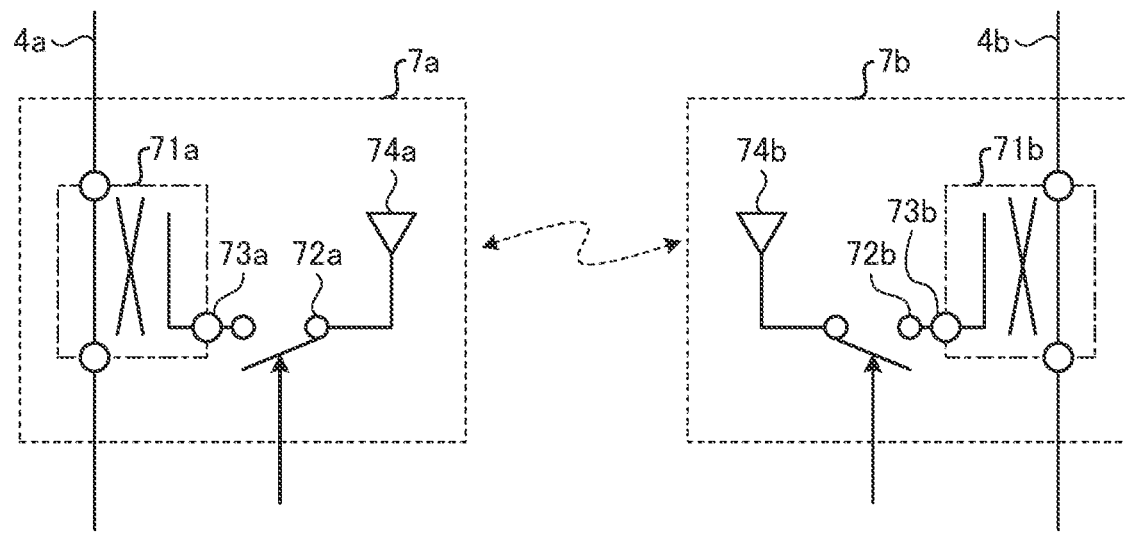
FIG. 16A is a first diagram illustrating an example of the block configurations of a first coupler circuit and a second coupler circuit according to the third embodiment.
Figure 16B:
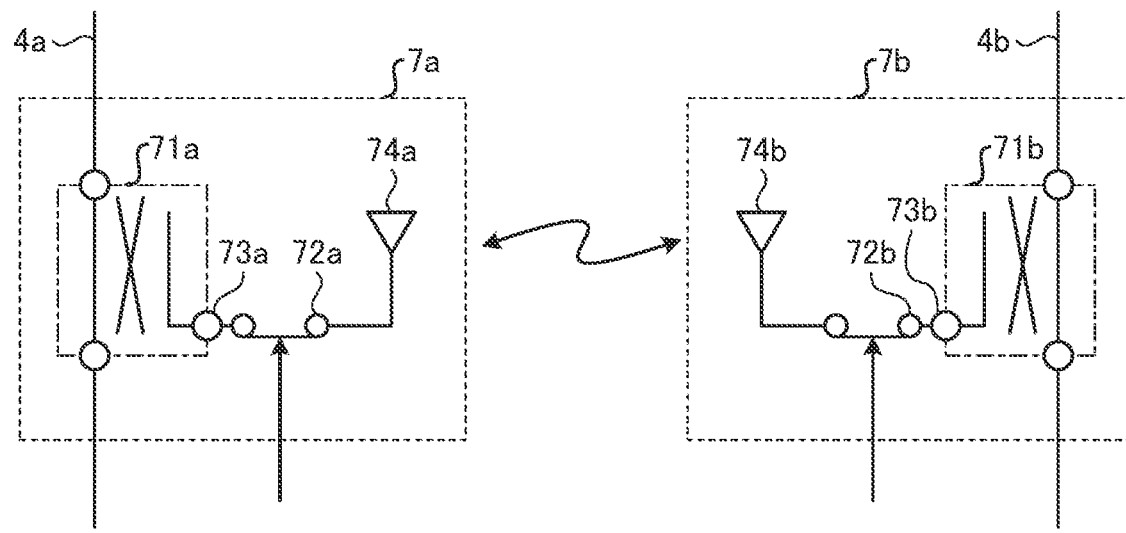
FIG. 16B is a second diagram illustrating the example of the block configurations of the first coupler circuit and the second coupler circuit according to the third embodiment.

FIG. 16A is a first diagram illustrating an example of the block configurations of the first coupler circuit 7a and the second coupler circuit 7b according to the third embodiment. FIG. 16B is a second diagram illustrating the example of the block configurations of the first coupler circuit 7a and the second coupler circuit 7b according to the third embodiment.

In the first coupler circuit 7a, a coupler 71a is a component corresponding to the coupler 51a of the second embodiment. A switch 72a is a component corresponding to the switch 52a of the second embodiment. The first coupler circuit 7a includes an antenna 74a, in addition to the coupler 71a and the switch 72a.

In the second coupler circuit 7b, a coupler 71b is a component corresponding to the coupler 51b of the second embodiment. A switch 72b is a component corresponding to the switch 52b of the second embodiment. The second coupler circuit 7b includes an antenna 74b, in addition to the coupler 71b and the switch 72b.

The first coupler circuit 7a and the second coupler circuit 7b may have, for example, an aspect in which the respective components are composed on a flexible substrate having flexibility or may have an aspect in which the respective components are composed on a dielectric substrate, as in the first coupler circuit 5a and the second coupler circuit 5b of the second embodiment. The present disclosure is not limited to the specific configurations of the first coupler circuit 7a and the second coupler circuit 7b.

The IF signal on the communication line 4a is branched by the coupler 71a. The antenna 74a is connected to a branch terminal 73a of the coupler 71a via the switch 72a.

The IF signal on the communication line 4b is branched by the coupler 71b. The antenna 74b is connected to a branch terminal 73b of the coupler 71b via the switch 72b.

The operation of the first coupler circuit 7a and the second coupler circuit 7b will now be described.

When the repeater operation is not performed in the communication terminal device 1b according to the third embodiment, the switches 72a and 72b are turned off, as illustrated in FIG. 16A. In contrast, when the repeater operation is performed in the communication terminal device 1b, the switches 72a and 72b are turned on, as illustrated in FIG. 16B. Specifically, when the transmission setting is made in Step S308 in the flowchart illustrated in FIG. 7, described in the first embodiment, the switches 72a and 72b are turned on. Accordingly, the repeater operation is capable of being performed through radio communication via the first coupler circuit 7a and the second coupler circuit 7b not via the baseband module (BB) 3.

Fourth Embodiment

Figure 17:
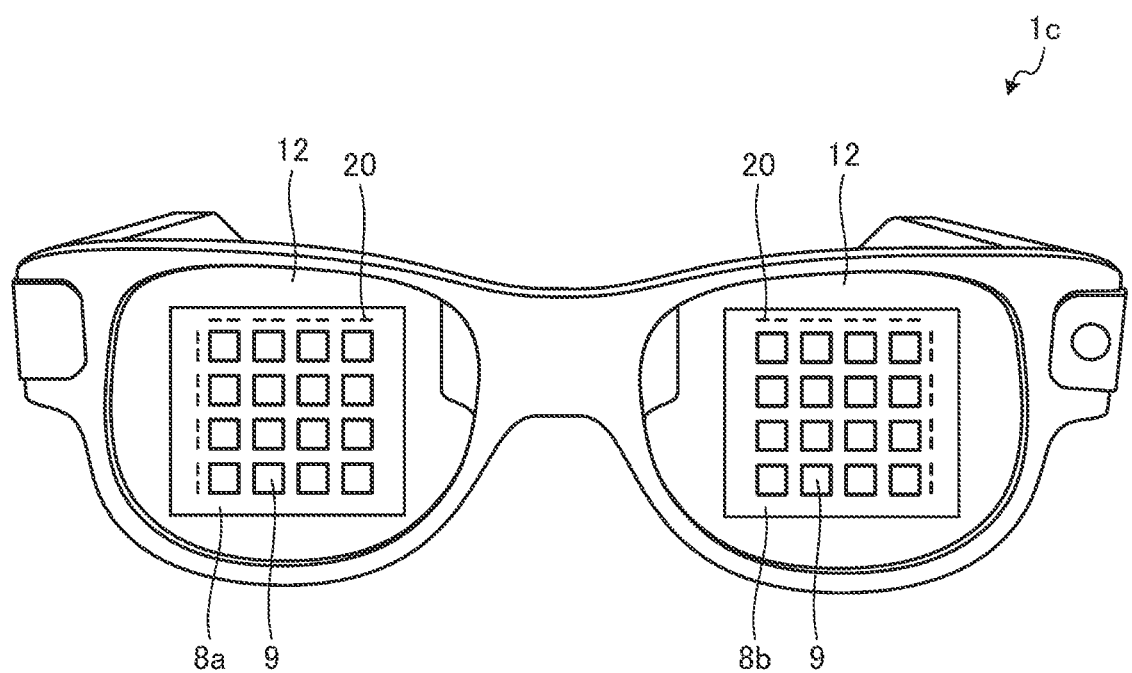
FIG. 17 is a diagram schematically illustrating an example of a communication terminal device according to a fourth embodiment.

FIG. 17 is a diagram schematically illustrating an example of a communication terminal device according to a fourth embodiment.

Although the aspect is described in the first embodiment described above, in which the antenna is integrated with the RFIC in the first RF module (RF1) 2a and the second RF module (RF2) 2b, an aspect is described in the fourth embodiment, as illustrated in FIG. 17, in which patch antennas 9 and dipole antennas 20 are arranged on dielectric substrates 8a and 8b of lenses 12 of a communication terminal device 1c, which is, for example, a glasses-type wearable communication terminal device. Although both the patch antenna 9 and the dipole antenna 20 are arranged on each of the dielectric substrates 8a and 8b in the fourth embodiment, only one of the patch antenna 9 and the dipole antenna 20 may be arranged on each of the dielectric substrates 8a and 8b. When signals are transmitted and received with the dipole antennas, it is not necessary to provide ground planes. Although the ground planes are required when signals are transmitted and received with the patch antennas, the directivity is capable of being concentrated along the line of sight.

In the fourth embodiment, the patch antennas 9 and the dipole antennas 20 are overlapped with the lenses 12 of the communication terminal device 1c in a plan view, as illustrated in FIG. 17. The dielectric substrates 8a and 8b may have film shapes and may be pasted on the lenses. In addition, although the dielectric substrates 8a and 8b each have a substantially rectangular shape in the fourth embodiment, the dielectric substrates 8a and 8b may each have the same shape as that of the lens and may be pasted over the lens.

Transparent substrates are used as the dielectric substrates 8a and 8b on which the array antennas are provided in order not to prevent the visibility of the lenses. In addition, the patch antennas 9, the dipole antennas 20, the ground planes, power supply lines, and so on are each made of a transparent conductive material, such as indium tin oxide. The dielectric substrates 8a and 8b are pasted on the front faces of the lenses 12 of the communication terminal device 1c using, for example, transparent adhesive. In this case, for example, an aspect may be supposed in which transparent protective films of the lenses 12 of the communication terminal device 1c are used as the dielectric substrates 8a and 8b or an aspect may be supposed in which the patch antennas 9, the dipole antennas 20, the ground planes, and the power supply lines, and so on, which are made of the transparent conductive material, are arranged in the transparent protective films.

The use of the dielectric substrates 8a and 8b, the patch antennas 9, and the dipole antennas 20, which are made of the transparent material, as in the fourth embodiment enables the degree of freedom of the arrangement of the antennas to be improved.

Although the configuration is adopted in FIG. 17 in which the patch antennas 9 and the dipole antennas 20 are pasted on the front faces of the lenses 12 of the communication terminal device 1c, the patch antennas 9, the dipole antennas 20, or both of the patch antennas 9 and the dipole antennas 20 may be arranged on the rear faces of the lenses 12 of the communication terminal device 1c or in the lenses 12 of the communication terminal device 1c.

Fifth Embodiment

Figure 18A:
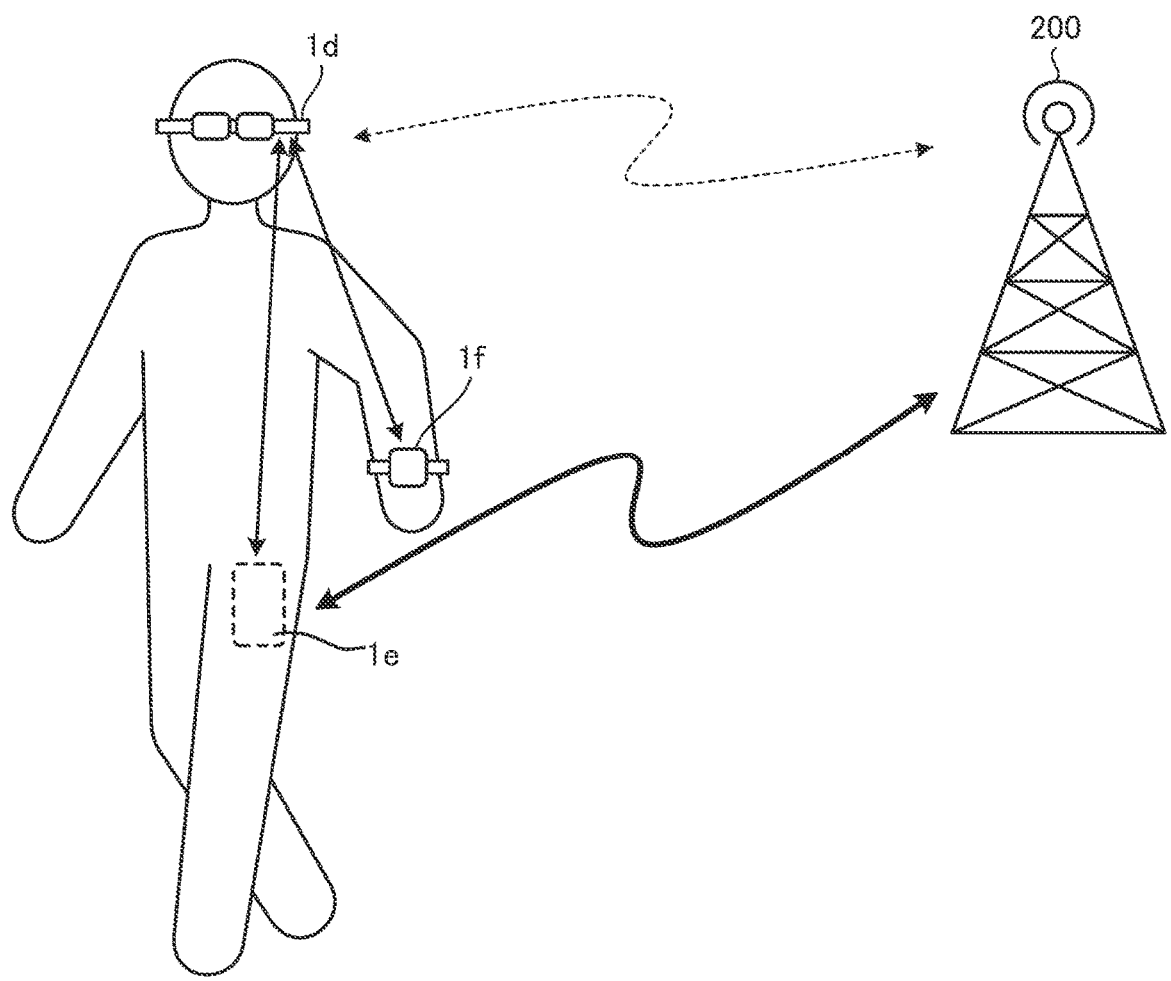
FIG. 18A is a schematic diagram illustrating a first example of the schematic configuration of a communication system according to a fifth embodiment.
Figure 18B:
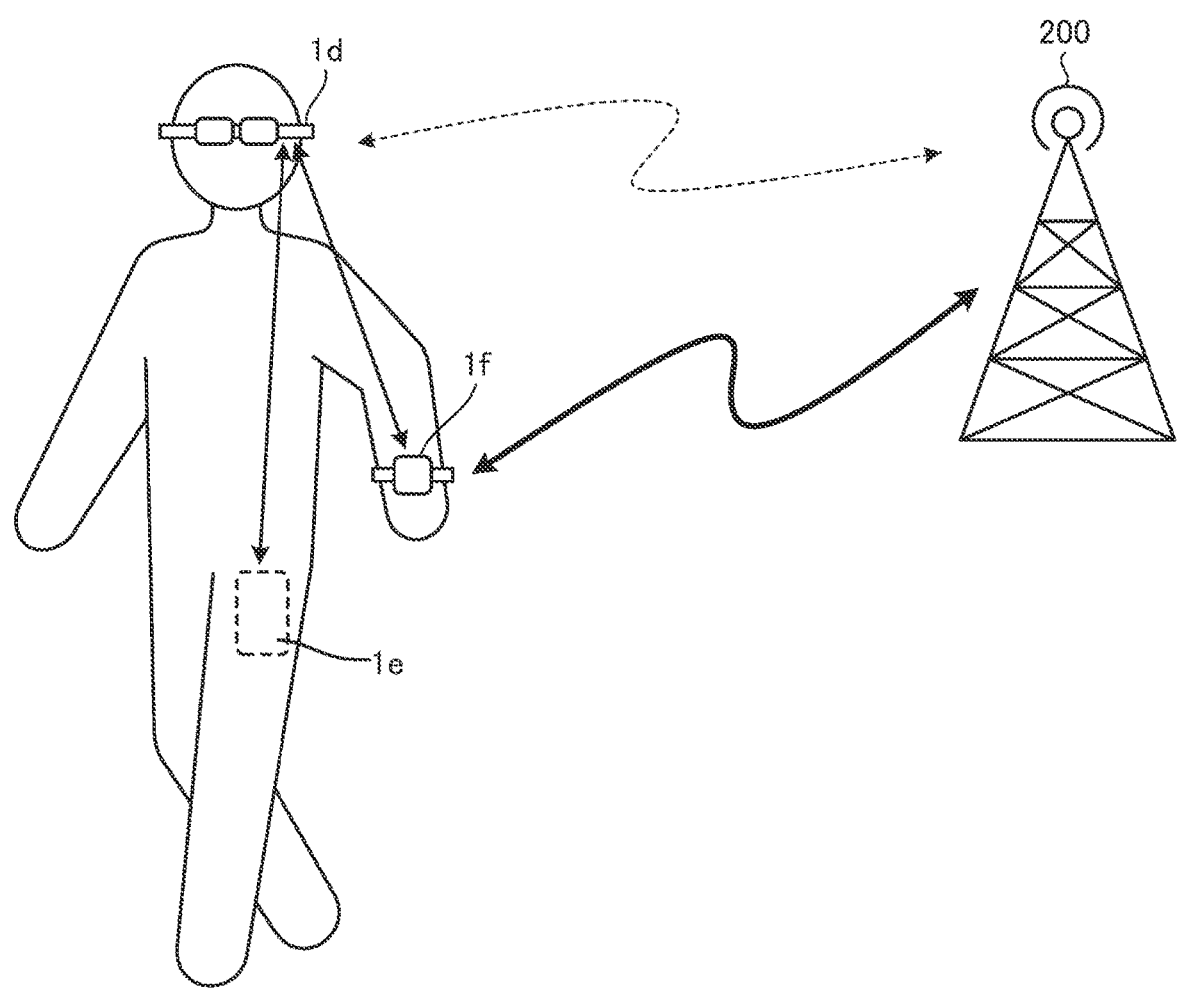
FIG. 18B is a schematic diagram illustrating a second example of the schematic configuration of the communication system according to the fifth embodiment.

FIG. 18A is a schematic diagram illustrating a first example of the schematic configuration of a communication system according to a fifth embodiment. FIG. 18B is a schematic diagram illustrating a second example of the schematic configuration of the communication system according to the fifth embodiment.

In the fifth embodiment, a first communication terminal device 1d, which is a glasses-type wearable communication terminal device, and second communication terminal devices 1e and 1f held by the user of the first communication terminal device 1d are provided, as illustrated in FIG. 18A and FIG. 18B. For example, the second communication terminal devices 1e and 1f transmit and receive signals at least to and from the first communication terminal device 1d.

Referring to FIG. 18A and FIG. 18B, the second communication terminal device 1e is a mobile information communication terminal device, such as a smartphone or a tablet personal computer (PC). An example is illustrated in FIG. 18A and FIG. 18B, in which the second communication terminal device 1e is housed in a pocket, a bag, or the like of the user. The second communication terminal device 1f is, for example, a wristwatch-type wearable terminal in FIG. 18A and FIG. 18B. The present disclosure is not limited by the aspects of the second communication terminal devices 1e and 1f.

In the first example illustrated in FIG. 18A, a case is supposed in which the received signal strength indicator of the second communication terminal device 1e is higher than the received signal strength indicator of the first communication terminal device 1d. In this case, the second communication terminal device 1e transmits a first signal received in the coverage area 300 of the radio base station 200 to the first communication terminal device 1d, and the first communication terminal device 1d receives the first signal transmitted from the second communication terminal device 1e. In addition, the first communication terminal device 1d transmits a second signal for retransmitting the first signal received by the second communication terminal device 1e in the coverage area 300 of the radio base station 200 to the second communication terminal device 1e. The second communication terminal device 1e retransmits the first signal upon reception of the second signal. It is possible to retransmit the first signal received by the second communication terminal device 1e to, for example, the first communication terminal device 1d existing in the coverage area 300 of the radio base station 200 in the above manner.

In the second example illustrated in FIG. 18B, a case is supposed in which the received signal strength indicator of the second communication terminal device 1f is higher than the received signal strength indicator of the first communication terminal device 1d. In this case, the second communication terminal device 1f transmits a first signal received in the coverage area 300 of the radio base station 200 to the first communication terminal device 1d, and the first communication terminal device 1d receives the first signal transmitted from the second communication terminal device 1f. In addition, the first communication terminal device 1d transmits a second signal for retransmitting the first signal received by the second communication terminal device 1f in the coverage area 300 of the radio base station 200 to the second communication terminal device 1f. The second communication terminal device 1f retransmits the first signal upon reception of the second signal. It is possible to retransmit the first signal received by the second communication terminal device 1f to, for example, the first communication terminal device 1d existing in the coverage area 300 of the radio base station 200 in the above manner.

Supposing the aspect in which, when the received signal strength indicator of the first communication terminal device 1d is low, the reception signal received by the second communication terminal device 1e or 1f held by the user of the first communication terminal device 1d is retransmitted by the first communication terminal device 1d in the above manner enables the communication quality in the coverage area to be further improved to further improve the robustness of communication (further improve the trouble resistance, that is, further stabilize the communication quality).

The embodiments described above are for facilitating the understanding of the present disclosure and are not intended to limit the present disclosure. Modifications or variations can be made in the present disclosure without departing from the spirit and scope of the present disclosure and the present disclosure is intended to cover various equivalents of the present disclosure.

The present disclosure may have the following configurations, as described above or instead of the configurations described above.

(1) According to an embodiment of the present disclosure, a communication terminal device is a glasses-type communication terminal device having an optically transmissive display mounted thereon. The communication terminal device includes first and second radio-frequency modules that perform radio-frequency signal processing and a baseband module that is connected to the first and second radio-frequency modules via communication lines so as to be communicable and that performs baseband signal processing. The first and second radio-frequency modules are selectively switched by the baseband module to perform a reception operation. When the first radio-frequency module performs the reception operation, a reception signal received by the first radio-frequency module is retransmitted from the second radio-frequency module.

With the above configuration, the first radio-frequency module, among the two radio-frequency modules, performs the reception operation and the second radio-frequency module retransmits the reception signal. Accordingly, for example, when the multiple communication terminal devices are arranged in the coverage area of a radio base station and the many communication terminal devices are concurrently connected, building relay connection through cooperation between the multiple communication terminal devices enables the communication quality in the coverage area to be improved, thus improving the robustness of communication (improving the trouble resistance, that is, stabilizing the communication quality).

(2) The communication terminal device in (1) preferably includes a first coupler circuit that branches a signal on the communication line between the first radio-frequency module and the baseband module, a second coupler circuit that branches a signal on the communication line between the second radio-frequency module and the baseband module, and a communication path provided between a branch terminal of the first coupler circuit and a branch terminal of the second coupler circuit.

(3) In the communication terminal device in (2), the communication terminal device preferably performs a repeater operation via the communication line provided between the branch terminal of the first coupler circuit and the branch terminal of the second coupler circuit.

With the above configuration, the repeater operation is capable of being performed via the communication line not via the baseband module.

(4) In the communication terminal device in (2), the communication terminal device preferably performs a repeater operation through radio communication via an antenna connected to the branch terminal of the first coupler circuit and an antenna connected to the branch terminal of the second coupler circuit.

With the above configuration, the repeater operation is capable of being performed through the radio communication via the antennas not via the baseband module.

(5) In any of the communication terminal devices in (1) to (4), the first and second radio-frequency modules may be provided on left-side and right-side temples.

(6) Any of the communication terminal devices in (1) to (4) may include antennas provided on lenses of the communication terminal device.

With the above configuration, the use of the antennas, which are made of a transparent material, enables the degree of freedom of the arrangement of the antennas to be improved.

(7) According to an embodiment of the present disclosure, a communication system includes the multiple communication terminal devices in any of (1) to (6), which are arranged in a coverage area of a radio base station. If a received signal strength indicator is lower than a predetermined first threshold value, the communication terminal device transmits a communication quality request signal requesting the received signal strength indicator of an external communication terminal device to the external communication terminal device. The communication terminal device transmits the received signal strength indicator to an external communication terminal device in response to the communication quality request signal from the external communication terminal device. If the received signal strength indicator transmitted from an external communication terminal device is higher than or equal to a predetermined second threshold value, the communication terminal device transmits a repeater operation requesting signal requesting a repeater operation to the external communication terminal device. The communication terminal device retransmits the reception signal in response to the repeater operation requesting signal.

With the above configuration, when the multiple communication terminal devices are arranged in the coverage area of a radio base station and the many communication terminal devices are concurrently connected, the cooperation between the multiple communication terminal devices builds the relay connection between the multiple communication terminal devices. Accordingly, it is possible to improve the communication quality in the coverage area and to improve the robustness of communication (improve the trouble resistance, that is, stabilize the communication quality).

(8) In the communication system in (7), if the received signal strength indicator transmitted from an external communication terminal device is lower than the second threshold value, the communication terminal device preferably transmits a repeater operation not-requesting signal requesting stop of the repeater operation to the external communication terminal device. The communication terminal device preferably stops the retransmission of the reception signal in response to the repeater operation not-requesting signal transmitted from an external communication terminal device.

(9) In the communication system in (8), the communication terminal device preferably retransmits the reception signal based on the repeater operation requesting signal transmitted from at least one external communication terminal device.

(10) In the communication system in (9), if the repeater operation not-requesting signal is transmitted from at least one external communication terminal device and the repeater operation requesting signal is transmitted from no communication terminal device, the communication terminal device preferably stops the retransmission of the reception signal.

(11) In any of the communication systems in (7) to (10), the second threshold value is preferably higher than the first threshold value.

(12) In any of the communication systems in (7) to (11), when the many communication terminal devices are concurrently connected, the communication terminal device preferably retransmits the reception signal.

(13) Any of the communication systems in (7) to (12) preferably includes a first communication terminal device, which is a glasses-type communication terminal device, and a second communication terminal device held by a user of the first communication terminal device. The second communication terminal device preferably transmits a first signal received in the coverage area to the first communication terminal device. The first communication terminal device preferably receives the first signal and preferably transmits a second signal for retransmission of the first signal by the second communication terminal device. The second communication terminal device preferably receives the second signal and preferably retransmits the first signal.

With the above configuration, it is possible to further improve the communication quality in the coverage area and to further improve the robustness of communication (further improve the trouble resistance, that is, further stabilize the communication quality).

The present disclosure provides a communication terminal device capable of sufficiently utilizing the performance of a communication circuit supporting the millimeter-wave band communication.

While preferred embodiments of the disclosure have been described above, it is to be understood that variations and modifications will be apparent to those skilled in the art without departing from the scope and spirit of the disclosure. The scope of the disclosure, therefore, is to be determined solely by the following claims.

What is claimed is:

1. An extended reality (XR) communication terminal device having an optically transmissive display mounted thereon, the XR communication terminal device comprising:
    first and second radio-frequency signal processing modules configured to perform radio-frequency signal processing, the first radio-frequency signal processing module being a left-side temple of the XR communication terminal device, the second radio-frequency signal processing module being on a right-side temple of the XR communication terminal device; and
    a baseband signal processing module that is connected to the first and second radio-frequency signal processing modules via communication lines, and that is configured to perform baseband signal processing,
    wherein the first and second radio-frequency signal processing modules are selectively switched by the baseband signal processing module to perform a reception operation, and,
    wherein when the first radio-frequency signal processing module performs the reception operation, the second radio-frequency module is configured to retransmit a reception signal received by the first radio-frequency signal processing.

2. The XR communication terminal device according to claim 1, further comprising:
    a first coupler circuit configured to branch a first signal on a communication line between the first radio-frequency signal processing module and the baseband signal processing module;
    a second coupler circuit configured to branch a second signal on a communication line between the second radio-frequency signal processing module and the baseband signal processing module; and
    a communication path between a branch terminal of the first coupler circuit and a branch terminal of the second coupler circuit.

3. The XR communication terminal device according to claim 2, wherein the XR communication terminal device is configured to perform a repeater operation via the communication path.

4. The XR communication terminal device according to claim 2, wherein the XR communication terminal device is configured to perform a repeater operation through radio communication via an antenna connected to the branch terminal of the first coupler circuit and an antenna connected to the branch terminal of the second coupler circuit.

5. The XR communication terminal device according to claim 1, further comprising:
    antennas on lenses of the XR communication terminal device.

6. A communication system comprising a plurality of the XR communication terminal devices according to claim 1 arranged in a coverage area of a radio base station,
    wherein, when a received signal strength indicator at a first of the plurality of XR communication terminal devices is less than a predetermined first threshold value, the first XR communication terminal device is configured to transmit a communication quality request signal requesting a received signal strength indicator at a second of the plurality of XR communication terminal devices to the second XR communication terminal device,
    wherein the second XR communication terminal device is configured to transmit the received signal strength indicator at the second XR communication terminal device to the first XR communication terminal device in response to the communication quality request signal from the first XR communication terminal device,
    wherein, when the received signal strength indicator transmitted from the second XR communication terminal device is greater than or equal to a predetermined second threshold value, the first XR communication terminal device is configured to transmit a repeater operation requesting signal requesting a repeater operation to the second XR communication terminal device, and
    wherein the second XR communication terminal device is configured to retransmit the reception signal in response to the repeater operation requesting signal.

7. The communication system according to claim 6,
    wherein, when the received signal strength indicator transmitted from the second XR communication terminal device is less than the second threshold value, the first XR communication terminal device is configured to transmit a repeater operation not-requesting signal requesting a stop of the repeater operation to the second XR communication terminal device, and
    wherein the second XR communication terminal device is configured to stop the retransmission of the reception signal in response to the repeater operation not-requesting signal transmitted from the first XR communication terminal device.

8. The communication system according to claim 7, wherein the XR communication terminal device retransmits the reception signal based on the repeater operation requesting signal transmitted from at least one XR communication terminal device.

9. The communication system according to claim 8, wherein, when the repeater operation not-requesting signal is transmitted from one of the plurality of XR communication terminal devices and the repeater operation requesting signal is not transmitted from any of the plurality of XR communication terminal devices, the second XR communication terminal device is configured to stop the retransmission of the reception signal.

10. The communication system according to claim 6, wherein the second threshold value is greater than the first threshold value.

11. The communication system according to claim 6, wherein, when the plurality of XR communication terminal devices are concurrently connected, the second XR communication terminal device is configured to retransmit the reception signal.

12. A communication system according to claim 1 comprising:
- a first XR communication terminal device according to claim 1, the first XR communication terminal device being a glasses-type XR communication terminal device arranged in a coverage area of a radio base station; and
- a second communication terminal device held by a user of the first XR communication terminal device,
- wherein the second communication terminal device is configured to transmit a first signal received in the coverage area to the first XR communication terminal device,
- wherein the first XR communication terminal device is configured to receive the first signal and to transmit a second signal for retransmission of the first signal by the second communication terminal device, and
- wherein the second communication terminal device is configured to receive the second signal and to retransmit the first signal.

13. The XR communication terminal device according to claim 1, wherein the baseband signal processing module is configured to selectively switch the first and second radio-frequency signal processing modules based on a quality of the reception signal.

14. The XR communication terminal device according to claim 1, wherein the first radio-frequency signal processing module is disposed at one side of the XR communication terminal device, and the second radio-frequency signal processing module is disposed at another side of the XR communication terminal device, wherein each of the first and second radio-frequency signal processing modules comprise electric circuits configured to process the received reception signal.

* * * * *

UNITED STATES PATENT AND TRADEMARK OFFICE
CERTIFICATE OF CORRECTION

PATENT NO. : 11,388,612 B2
APPLICATION NO. : 17/142430
DATED : July 12, 2022
INVENTOR(S) : Ryuken Mizunuma et al.

It is certified that error appears in the above-identified patent and that said Letters Patent is hereby corrected as shown below:

In the Specification

Column 21, Line 56, "if" should be -- 1f --.

Column 21, Line 59, "if" should be -- 1f --.

Column 21, Line 67, "if" should be -- 1f --.

Column 22, Line 29, "if" should be -- 1f --.

Column 22, Line 32, "if" should be -- 1f --.

Column 22, Line 39, "if" should be -- 1f --.

Column 22, Line 42, "if" should be -- 1f --.

Column 22, Line 45, "if" should be -- 1f --.

Column 22, Line 51, "if" should be -- 1f --.

Signed and Sealed this
Sixth Day of June, 2023

Katherine Kelly Vidal
*Director of the United States Patent and Trademark Office*